United States Patent
Tsujimoto

(10) Patent No.: US 8,879,078 B2
(45) Date of Patent: Nov. 4, 2014

(54) DISPLAY CONTROL APPARATUS COMMUNICATING WITH A MULTIFUNCTION PERIPHERAL TO PRESENT OPERATIONAL INFORMATION TO USERS

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 140 days.

(21) Appl. No.: 13/565,545

(22) Filed: Aug. 2, 2012

(65) Prior Publication Data

US 2013/0033718 A1 Feb. 7, 2013

(30) Foreign Application Priority Data

Aug. 4, 2011 (JP) ................................. 2011-171269

(51) Int. Cl.
 *G06F 3/12* (2006.01)
 *H04N 1/00* (2006.01)
 *G06F 9/44* (2006.01)
 *G09G 5/00* (2006.01)

(52) U.S. Cl.
 CPC .......... *G06F 9/4446* (2013.01); *H04N 1/00204* (2013.01); *H04N 2201/0094* (2013.01); *H04N 1/00464* (2013.01); *H04N 1/00411* (2013.01); *H04N 1/00482* (2013.01); *H04N 1/00474* (2013.01); *H04N 1/00973* (2013.01)
 USPC ........................................ 358/1.13; 345/156

(58) Field of Classification Search
 USPC ............... 358/1.1, 1.9, 1.13, 1.14, 1.15, 1.18; 345/1.1, 156, 204
 See application file for complete search history.

(56) References Cited

U.S. PATENT DOCUMENTS

| | | | |
|---|---|---|---|
| 7,814,236 B2 | 10/2010 | Tsujimoto | |
| 8,176,075 B2 * | 5/2012 | Kuroyanagi | 707/781 |
| 8,625,119 B2 * | 1/2014 | Tsujimoto | 358/1.13 |
| 2004/0075857 A1 * | 4/2004 | Akiyoshi et al. | 358/1.13 |
| 2007/0159663 A1 * | 7/2007 | Tsujimoto | 358/448 |
| 2007/0200856 A1 | 8/2007 | Tashiro | |
| 2007/0268517 A1 * | 11/2007 | Koarai | 358/1.15 |
| 2008/0150952 A1 * | 6/2008 | Koarai | 345/531 |
| 2010/0149592 A1 | 6/2010 | Yoshida | |
| 2011/0134456 A1 | 6/2011 | Tsujimoto | |
| 2011/0199645 A1 * | 8/2011 | Ito | 358/1.15 |

FOREIGN PATENT DOCUMENTS

| | | |
|---|---|---|
| CN | 101025602 A | 8/2007 |
| JP | 2006-221581 A | 8/2006 |
| JP | 2006-221851 A | 8/2006 |
| JP | 2007-174400 A | 7/2007 |
| JP | 2010-146078 A | 7/2010 |
| JP | 2010-185994 A | 8/2010 |
| JP | 2011-124652 A | 6/2011 |

* cited by examiner

*Primary Examiner* — Gabriel Garcia

(74) *Attorney, Agent, or Firm* — Edwards Wildman Palmer LLP; David G. Conlin; George N. Chaclas

(57) ABSTRACT

A manual display application common to a standard application and an external application controls display of both of an operation manual of the standard application and an operation manual of the external application. With the arrangement, the operation manuals of the respective applications can be displayed in a unified manner.

6 Claims, 28 Drawing Sheets

FIG. 3

```
<?xml version="1.0"?>
<Operation>
  <Screen>COPY</Screen>
  <Button></Button>
</Operation>
```

FIG. 7

```
<?xml version="1.0"?>
<Operation>
  <Screen>COPY</Screen>
  <Button>EXPOSURE</Button>
</Operation>
```

FIG. 9

```
<?xml version="1.0"?>
<OperationResponse>
  <Screen> (MANUAL DATA) </Screen>
</OperationResnponse>
```

FIG. 10

| SET ITEM | DESCRIPTION |
|---|---|
| AUTO | Generally, this mode is selected. This mode automatically makes adjustment so that optimum image quality is obtained in a case where monochromatic copy or full-color copy is selected. |
| TEXT | This mode is suitable for a general text document. |
| TEXT/PRINTED PHOTOGRAPH | This mode is suitable in a case where a user wants to place importance not only on an image quality of a photograph part but also on an image quality of a text part such as an article when copying a printed material such as magazine or catalog. |
| TEXT/PHOTOGRAPH | This mode is suitable for copying a text document to which a photograph is pasted. |
| PRINTED PHOTOGRAPH | This mode is suitable in a case where a user wants to give priority to an image quality of a photograph part when copying a printed material such as magazine or catalog. |
| PHOTOGRAPH | This mode is suitable for copying a photograph. |
| MAP | This mode is suitable for copying a map that is drawn in different colors and contains small characters. |

FIG. 13

```
<?xml version="1.0"?>
<OperationResponse>
 <Page>26</Page >
 <Section>EXPOSURE</Section>
</OperationResnponse>
```

FIG. 16

```
<html>
  <body>
    <h2>DOCUMENT MANAGEMENT APPLICATION</h2>
    <form name="Auth" method="post" action="http://123.123.123.123/app/auth">
      <p>LOGIN NAME:<input type="text" name="login_name" size="50"></p>
      <p>PASSWORD:<input type="password" name="password" size="50"></p>
      <input type="submit" value="LOGIN">
      <input type="reset" value="RESET">
    </form>
  </body>
</html>
```

FIG. 17

```
DOCUMENT MANAGEMENT APPLICATION

LOGIN NAME : [                    ]

PASSWORD   : [                    ]

[ LOGIN ]   [ RESET ]
```

FIG. 24

```
<?xml version="1.0"?>
<Operation>
  <Screen>NONE</Screen>
  <Button></Button>
</Operation>
```

FIG. 27

| APPLICATION | DISPLAY POLICY (STYLE SHEET) | FONT SIZE | FONT TYPE | FONT COLOR | BACKGROUND COLOR |
|---|---|---|---|---|---|
| STANDARD FUNCTION | DISPLAY POLICY 1 (STYLE SHEET 1) | 30 POINTS | MING | BLACK | LIGHT BLUE |
| DOCUMENT MANAGEMENT APPLICATION | DISPLAY POLICY 1 (STYLE SHEET 1) | 30 POINTS | MING | BLACK | LIGHT BLUE |
| LEDGER SHEET PRINTING APPLICATION | DISPLAY POLICY 2 (STYLE SHEET 2) | 30 POINTS | GOTHIC | BLUE | BEIGE |

DISPLAY CONTROL APPARATUS COMMUNICATING WITH A MULTIFUNCTION PERIPHERAL TO PRESENT OPERATIONAL INFORMATION TO USERS

This Nonprovisional application claims priority under 35 U.S.C. §119 on Patent Application No. 2011-171269 filed in Japan on Aug. 4, 2011, the entire contents of which are hereby incorporated by reference.

TECHNICAL FIELD

The present invention relates to a display control apparatus and a display control method each of which is for controlling a display content on a multifunction peripheral that is communicably connected to the display control apparatus via a communication network.

BACKGROUND ART

Conventionally, a system is proposed in which a multifunction peripheral (MFP) operates as part of a total application system. In the system, the multifunction peripheral and an information processing apparatus such as a personal computer are communicably connected to each other so that functions of the multifunction peripheral and functions of an application that operates in the information processing apparatus work in association with each other. For example, Patent Literature 1 discloses a multifunction peripheral control system including a multifunction peripheral and an information processing apparatus which gives the multifunction peripheral a control instruction via a communication network. In this type of system, in a case where the multifunction peripheral utilizes an application that operates in the information processing apparatus, a UI (user interface) screen customized to suit the application is sent from the information processing apparatus to the multifunction peripheral, and the multifunction peripheral causes the UI screen to be displayed. In this way, a user inputs a desired instruction (e.g., print instruction, scan instruction) to the UI screen.

Further, a technique of causing an operation manual such as a manual for an electronic applicant to be stored in the form of electronic data and displaying a part of the operation manual which part corresponds to an instruction from a user is conventionally known. For example, Patent Literature 2 discloses an operation manual display device which (i) stores an operation manual in the form of electronic data so that an image having identical contents to a paper manual can be displayed and (ii) displays, in response to a user's operation, information in the operation manual which information is relevant to the user's operation in a manner easy to understand for the user.

CITATION LIST

Patent Literature 1
Japanese Patent Application Publication, Tokukai, No. 2007-174400 A (Publication Date: Jul. 5, 2007)
Patent Literature 2
Japanese Patent Application Publication, Tokukai, No. 2010-185994 A (Publication Date: Aug. 26, 2010)

SUMMARY OF INVENTION

Technical Problem

The technique of Patent Literature 2 is very useful in a case where a user operation and a part, corresponding to the user operation, of an operation manual are stored in an association table in advance. However, in a case where the technique of Patent Literature 2 is applied to the system in which a multifunction peripheral operates as part of a total application system, it is undesirably difficult to display operation manuals corresponding to user's operations in a unified manner.

Specifically, in such a total application system, the multifunction peripheral (i) causes a UI screen sent from the information processing apparatus to be displayed, (ii) transmits, to the information processing apparatus, a user operation inputted to the UI screen, and (iii) controls an operation of the multifunction peripheral on the basis of control information that is sent from the information processing apparatus in response to the user operation. Accordingly, the multifunction peripheral itself cannot grasp a display content of the UI screen and a specific content of the user operation, and therefore cannot control display of an operation manual corresponding to the user operation. This makes it necessary for individual applications to control display of their operation manuals. As a result, the operation manuals cannot be displayed in a unified manner.

The present invention was attained in view of the above problems, and an object of the present invention is to display operation manuals of respective applications in a unified manner in a multifunction peripheral control system which (i) includes a multifunction peripheral and an information processing apparatus communicably connected to the multifunction peripheral and (ii) has (a) a standard function of controlling an apparatus function of the multifunction peripheral with the use of a standard application that operates in the multifunction peripheral and (b) an expanded function of controlling an apparatus function of the multifunction peripheral with the use of an external application that operates in the information processing apparatus.

Solution to Problem

In order to attain the above object, a display control apparatus of the present invention is a display control apparatus for controlling a display content of a display section of a multifunction peripheral that is communicably connected to the display control apparatus or a display content of a display section that is disposed in vicinity of the multifunction peripheral, the multifunction peripheral having (i) a standard function of controlling one or a plurality of apparatus functions of the multifunction peripheral with use of a standard application operating in the multifunction peripheral and (ii) an expanded function of controlling the one or a plurality of apparatus functions of the multifunction peripheral with use of an external application operating in another apparatus communicably connected to the multifunction peripheral, and the multifunction peripheral including an operation input section for accepting operation input from a user of the multifunction peripheral, the display control apparatus including a manual display control section that controls display, on the display section, of both of an operation manual of the standard application and an operation manual of the external application, the manual display control section causing the display section to display an operation manual of an application for which an operation is being inputted by the user via the operation input section out of the standard application and the external application.

A display control method of the present invention is a display control method in a multifunction peripheral control system including (i) a multifunction peripheral and (ii) a display control apparatus that is communicably connected to the multifunction peripheral and that controls a display content of a display section of the multifunction peripheral or a display content of a display section that is disposed in vicinity of the multifunction peripheral, the multifunction peripheral having (i) a standard function of controlling one or a plurality of apparatus functions of the multifunction peripheral with use of a standard application operating in the multifunction peripheral and (ii) an expanded function of controlling the one or a plurality of apparatus functions of the multifunction peripheral with use of an external application operating in another apparatus communicably connected to the multifunction peripheral, and the multifunction peripheral including an operation input section for accepting operation input from a user of the multifunction peripheral, the display control method including the step of (a) causing a manual display control section, which is provided in the display control apparatus and which is common to the standard application and the external application, to control display, on the display section, of both of an operation manual of the standard application and an operation manual of the external application, in the step (a), an operation manual of an application for which an operation is being inputted by the user via the operation input section being displayed on the display section.

Advantageous Effects of Invention

As described above, according to the display control apparatus and the display control method of the present invention, operation manuals of respective applications can be displayed in a unified manner.

BRIEF DESCRIPTION OF DRAWINGS

FIG. 3 is an explanatory view illustrating an example of user operation information that is sent from the multifunction peripheral to an information processing apparatus in a case where a copy mode has been selected in the multifunction peripheral control system illustrated in FIG. 1.

FIG. 7 is an explanatory view illustrating an example of user operation information sent from the multifunction peripheral to the information processing apparatus in the processing shown in FIG. 5.

FIG. 9 is an explanatory view illustrating an example of manual display data sent from the information processing apparatus to the display device in the processing shown in FIG. 5.

FIG. 10 is an explanatory view illustrating an example of an operation manual displayed on the display device in the processing shown in FIG. 5.

FIG. 13 is an explanatory view illustrating an example of manual display data sent from the information processing apparatus to the multifunction peripheral in the processing of FIG. 12.

FIG. 16 is an explanatory view illustrating screen data of a login screen for a document management application which screen data is sent from the information processing apparatus to the multifunction peripheral in the processing shown in FIG. 15.

FIG. 17 is an explanatory view illustrating a login screen that is displayed on the display section of the multifunction peripheral on the basis of the screen data of FIG. 16.

FIG. 18 (*b*) is an explanatory view illustrating an example of a UI screen displayed on the display section of the multifunction peripheral in the processing shown in FIG. 15.

FIG. 19 (*b*) is an explanatory view illustrating an example of an operation manual displayed on the display device in the processing shown in FIG. 15.

FIG. 24 is an explanatory view illustrating an example of neglected state notification sent from the multifunction peripheral to the information processing apparatus in a case where no operation has been made by a user for a predetermined period of time from the last operation input in the multifunction peripheral control system illustrated in FIG. 1.

FIG. 27 is an explanatory view illustrating an example of a style sheet used in the processing shown in FIG. 26.

DESCRIPTION OF EMBODIMENTS

An embodiment of the present invention is described below.

(1-1. Configuration of Multifunction Peripheral Control System 100)

Figure 1:
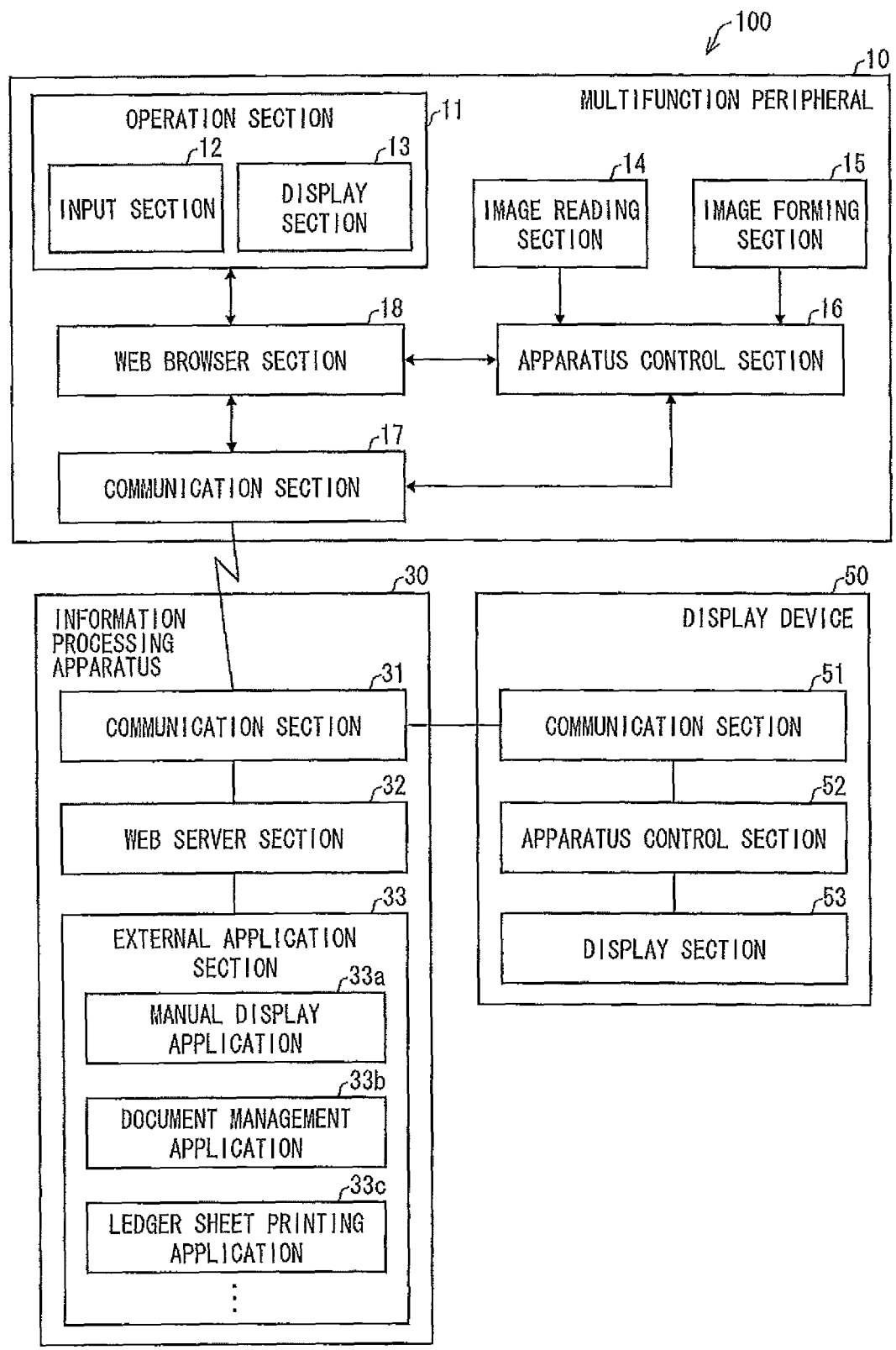
FIG. 1 is an explanatory view illustrating a configuration of a multifunction peripheral control system of an embodiment of the present invention.

FIG. 1 is an explanatory view illustrating a configuration of a multifunction peripheral control system 100 of the present embodiment. As illustrated in FIG. 1, the multifunction peripheral control system 100 includes a multifunction peripheral 10, an information processing apparatus (display control apparatus, another apparatus) 30, and a display device 50. The information processing apparatus 30 is communicably connected to each of the multifunction peripheral 10 and the display device 50 via a communication network or the like. Note that the number of multifunction peripherals 10, the number of information processing apparatuses 30, and the number of display devices 50 included in the multifunction peripheral control system 100 may be 1 or may be more than 1. Note also that the communication network is not limited to a specific one, and can be, for example, a communication line such as Internet, telephone line, serial cable, or another wired or wireless line. The multifunction peripheral 10 and the display device 50 may be communicably connected to each other. In such a case, the information processing apparatus 30 may control display of the display device 50 via the multifunction peripheral 10. Alternatively, the multifunction peripheral 10 may control display of the display device 50 in accordance with an instruction from the information processing apparatus 30.

The information processing apparatus 30 is a computer apparatus that is constituted by a processing section (e.g., a CPU, a dedicated processor, and the like.) and a storage section including RAM, ROM, HDD, and the like. The information processing apparatus 30 functions as a web server apparatus for the one or plurality of multifunction peripheral 10. As illustrated in FIG. 1, the information processing apparatus 30 includes a communication section 31, a web server section 32, and an external application section 33.

The communication section 31 communicates with the multifunction peripheral 10 and the display device 50 via the communication network. Note that the communication section 31 communicates with the multifunction peripheral 10 with the use of an HTTP protocol.

The web server section 32 operates in accordance with software of a web server. The "web server" as used herein refers to software for providing functions of a server apparatus that constitutes WWW (World Wide Web) which is an information system on the Internet. The web server section 32 has a function of receiving a request (HTTP request) from the multifunction peripheral 10 via the communication section 31 and returning, to the multifunction peripheral 10 via the communication section 31, a response (HTTP response) including a file, image data, print data, control information, and the like corresponding to the request.

The external application section (manual display control section, external application processing section) 33 operates in accordance with a predetermined web application in response to an instruction from the web server section 32. That is, the external application section 33 operates in accordance with various kinds of web applications operating on the web server.

In the present embodiment, the external application section 33 includes a manual display application 33a, a document management application 33b, and a ledger sheet printing application 33c. Note, however, that applications included in the external application section 33 are not limited to these, and the external application section 33 may include other applications for controlling an apparatus function of the multifunction peripheral 10.

For example, the external application section 33 operates in accordance with an operation screen sending application in a case where the request (HTTP request) from the multifunction peripheral 10 is a request to send a UI screen (operation screen). Specifically, the external application section 33 reads out, from a storage section (not illustrated), HTML data of the operation screen designated by the request and sends the HTML data to the web server section 32. Meanwhile, the external application section 33 operates in accordance with a print application in a case where the request from the multifunction peripheral 10 is a request to send print data. Specifically, the external application section 33 acquires print data of a designated file name from a folder of a folder name designated by the request and sends the print data to the web server section 32.

The display device 50 is placed in the vicinity of the multifunction peripheral 10 (in a place where a user who inputs an operation to the multifunction peripheral 10 is capable of viewing a display content of the display device 50 (e.g., a back surface side or a side surface side of the multifunction peripheral 10)). The display device 50 display, for a user, various kinds of information (e.g., UI screen, operation manual) corresponding to an instruction from the information processing apparatus 30 (or the multifunction peripheral 10). As illustrated in FIG. 1, the display device 50 includes a communication section 51, an apparatus control section 52, and a display section 53.

The communication section 51 communicates with the information processing apparatus 30 (or the multifunction peripheral 10) via the communication network.

The apparatus control section 52 controls an operation of the display section 53 so that an image corresponding to an instruction from the information processing apparatus 30 (or the multifunction peripheral 10) is displayed on the display section 53.

The display section 53 is not limited to a specific one, provided that it can display an image corresponding to image data. The display section 53 can be, for example, a liquid crystal display, a plasma display, an organic EL display, or a CRT display.

Note that the display section 53 preferably has a larger display screen than a display section 13 of the multifunction peripheral 10. In recent years, a large-sized display can be purchased at a relatively low price. In a case where a large-sized display is placed in the vicinity of the multifunction peripheral 10, a lot of information can be displayed well for a user of the multifunction peripheral 10.

The following describes a configuration of the multifunction peripheral 10. The multifunction peripheral 10 is an apparatus that is capable of executing a plurality of apparatus functions such as a copy function, a scan function, a print function, a facsimile sending/receiving function, and an image data sending function. Further, the multifunction peripheral 10 has (i) a standard function of controlling the apparatus functions of the multifunction peripheral 10 on the basis of a program (native application, standard application) included in the multifunction peripheral 10 and (ii) an expanded function of controlling the apparatus functions of the multifunction peripheral 10 on the basis of an application (external application, OSA (Open System architecture) application) that operates in the information processing apparatus 30. A program of the standard function is stored in a storage section (not illustrated) of the multifunction peripheral 10, and an apparatus control section 16 executes this program. The expanded function is executed by causing the external application section 33 of the information processing apparatus 30 to execute an application program stored in a storage section (not illustrated) of the information processing apparatus 30.

As illustrated in FIG. 1, the multifunction peripheral 10 includes an operation section 11, an image reading section 14, an image forming section 15, a web browser section 18, a communication section 17, and the apparatus control section 16.

The operation section 11 is a user interface which presents information to a user and which accepts an input from the user. The operation section 11 includes, for example, a display section (operation screen display section) 13 such as a liquid crystal display and an input section (operation input section) 12 having various kinds of input keys. Note that the operation section 11 may be a touch panel combining the display section 13 and the input section 12.

The image reading section 14 includes a scanner and a document carrying section for carrying a document to a place where the document is to be read by the scanner. The image reading section 14 reads (scans) a text and an image printed on a document at a predetermined resolution so as to acquire image data of the document.

The image forming section 15 prints an image (e.g., text, photograph, graphic, or a combination of these) corresponding to image data onto a recording sheet such as a sheet of paper. In the present embodiment, the image forming section 15 is an electrophotographic image forming apparatus including a photoreceptor drum, a charging device, an exposure device, a developing device, a transfer device, a fixing device, a sheet tray, etc. Note, however, that the configuration of the image forming section 15 is not limited to this, and the image forming section 15 may be an image forming apparatus of a different type such as an inkjet type.

The communication section 17 is a communication interface that communicates with an external apparatus such as the information processing apparatus 30. In the present embodiment, the communication section 17 communicates with the information processing apparatus 30 with the use of a HTTP protocol as described above.

The web browser section 18 operates in accordance with generally-used web browser software. The web browser section 18 communicates with the web server section 32 of the information processing apparatus 30 via the communication section 17 and receives operation screen information and control information. The multifunction peripheral 10 executes various functions (e.g., scan function, print function, communication function) of the multifunction peripheral 10 on the basis of the received control information. Specifically, for example, means in the multifunction peripheral 10 which means collaborates with the external application section 33 of the information processing apparatus 30 receives HTML (Hypertext Markup Language) data indicative of an operation screen from the information processing apparatus 30 and causes the operation screen indicated by the HTML data to be displayed. Then, the multifunction peripheral 10 (i) sends, to the information processing apparatus 30, a content of an instruction inputted by a user to the operation screen, (ii) receives a control command that is sent by the external application section 33 of the information processing apparatus 30 in accordance with a result of analysis of the content of the instruction, and (iii) executes a function of various kinds in response to the instruction of the control command.

The apparatus control section 16 controls operations of respective sections of the multifunction peripheral 10. Specifically, in a case where the standard function is executed, the apparatus control section 16 controls operations of the respective sections of the multifunction peripheral 10 on the basis of (i) an instruction from a user that is inputted via the operation section 11 and (ii) a program (native application) stored in the multifunction peripheral 10. Meanwhile, in a case where the expanded function is executed, the apparatus control section 16 controls operations of the respective sections of the multifunction peripheral 10 on the basis of a control instruction that is sent from the external application section 33 of the information processing apparatus 30 in response to an instruction from a user that is inputted via the operation section 11.

For example, in a case where a copy mode, which is one example of the standard function, is executed, a user gives an instruction to execute copy by using the input section 12 of the operation section 11. This instruction is sent to the apparatus control section 16, and the apparatus control section 16 controls the image reading section 14 on the basis of a standard copy application (native application) in the multifunction peripheral 10 to carry out document scan processing and controls the image forming section 15 to carry out print processing during or after the scan processing.

In a case where the expanded function is executed, the apparatus control section 16 causes the display section 13 to display a UI screen received from the information processing apparatus 30. Then, the apparatus control section 16 sends, to the information processing apparatus 30 via the communication section 17, an instruction from a user inputted to the UI screen via the input section 12. Then, the apparatus control section 16 controls operations of the respective sections of the multifunction peripheral 10 in accordance with a control instruction that is sent from the information processing apparatus 30 to the communication section 17.

In the present embodiment, the manual display application 33a provided in the external application section 33 of the information processing apparatus 30 controls both of (i) processing of displaying an operation manual concerning a standard function during execution of the standard function and (ii) processing of displaying an operation manual concerning an expanded function during execution of the expanded function. Details of a display control method for an operation manual are described later.

(1-2. Operation of Multifunction Peripheral 10)

Figure 2:
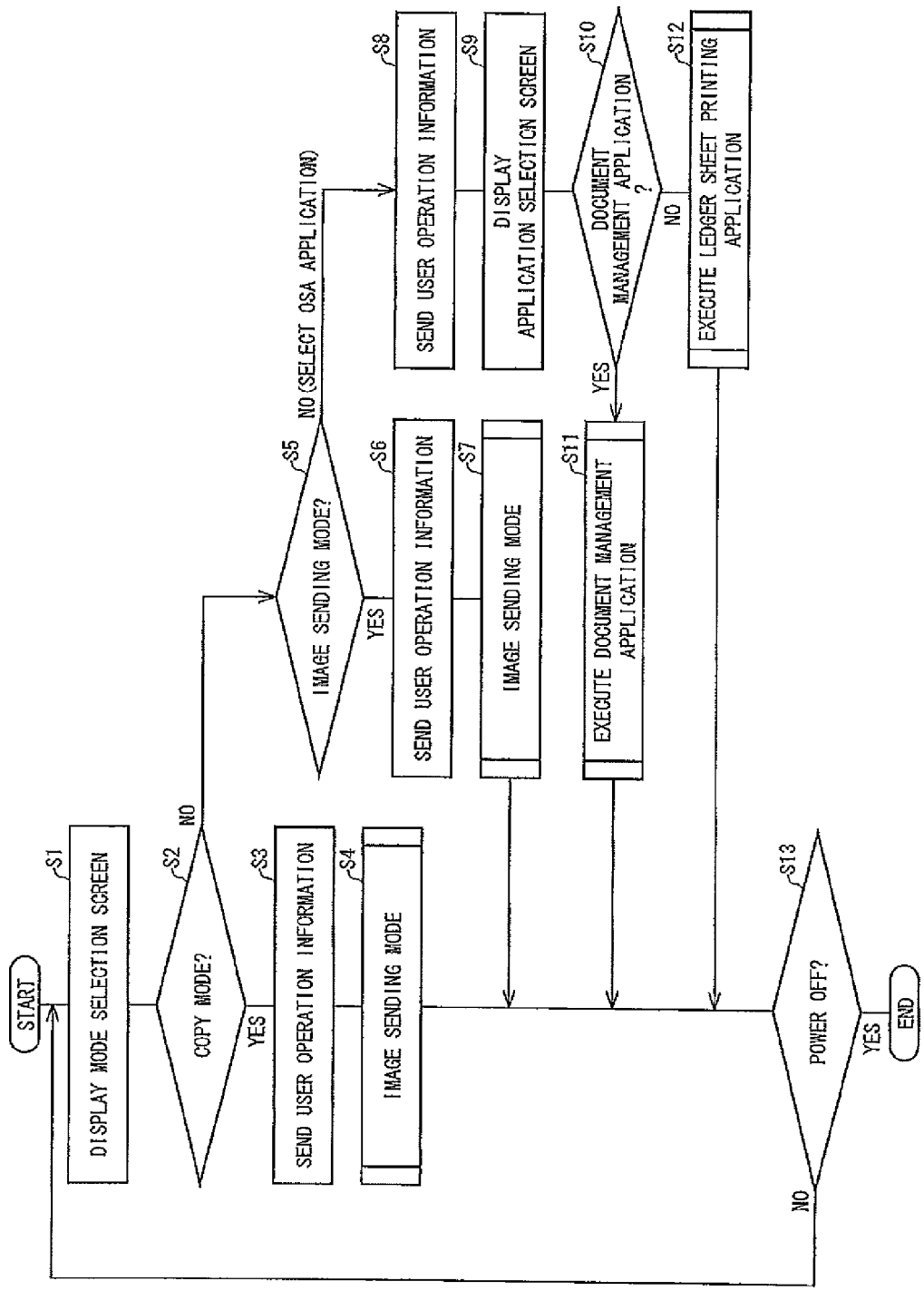
FIG. 2 is a flow chart showing a flow of processing in a multifunction peripheral provided in the multifunction peripheral control system illustrated in FIG. 1.

The following describes a flow of processing in the multifunction peripheral 10. FIG. 2 is a flow chart showing an outline of the processing in the multifunction peripheral 10.

In response to activation of the multifunction peripheral 10, the apparatus control section 16 of the multifunction peripheral 10 causes the display section 13 to display a mode selection screen (S1). In the present embodiment, any of the copy mode, image sending mode, and OSA mode is selected on this mode selection screen. The copy mode and the image sending mode are respectively modes for carrying out copy processing and image sending processing, each of which is based on the standard function of the multifunction peripheral 10. The OSA mode is a mode for carrying out processing of the expanded function of controlling the apparatus functions of the multifunction peripheral 10 under control of the external application section 33 of the information processing apparatus 30. Note that such an arrangement is also possible in which (i) a predetermined one of the aforementioned modes is selected as a default mode in response to activation of the multifunction peripheral 10 and (ii) a user switches the default mode into another mode as necessary.

Next, the apparatus control section 16 determines whether or not a mode selected by a user is the copy mode (S2). In a case where it is determined that the copy mode has been selected, the apparatus control section 16 generates user operation information indicating that the copy mode has been selected, and sends the user operation information to the information processing apparatus 30 via the web browser section 18 and the communication section 17 (S3). FIG. 3 illustrates an example of the user operation information that is sent from the multifunction peripheral 10 to the information processing apparatus 30 in a case where the copy mode has been selected. "COPY" indicative of the copy mode is stored in a <Screen> tag in order to indicate that a copy screen has been selected. No information is stored in a <Button> tag since this user operation information indicates an operation content for displaying an initial screen of the copy screen. FIG. 3 illustrates an example in which XML tag data is sent as the user operation information. Note, however, that a data format of the user operation information is not limited to this, and can be, for example, HTML or other formats. The XML format has an advantage of easily changing definition of a tag, whereas the HTML format has an advantage of easily sending notification from the multifunction peripheral 10 inside a firewall to the information processing apparatus 30 outside the firewall.

Thereafter, the apparatus control section 16 executes processing of the copy mode on the basis of a copy application stored in the storage section (not illustrated) of the multifunction peripheral 10 (S4), and then a process in S13 is carried out.

In a case where it is determined in S2 that the copy mode has not been selected, the apparatus control section 16 determines whether or not the mode selected by the user is the image sending mode (S5). In a case where it is determined that the image sending mode has been selected, the apparatus control section 16 generates user operation information indicating that the image sending mode has been selected, and sends this user operation information to the information processing apparatus 30 via the web browser section 18 and the communication section 17 (S6). The user operation information is, for example, data of FIG. 3 in which "COPY" in the <Screen> tag is replaced with "IMAGE SEND" indicative of the image sending mode. Subsequently, the apparatus control section 16 executes processing of the image sending mode on the basis of an image sending application stored in the storage section (not illustrated) of the multifunction peripheral 10 (S7), and then a process in S13 is carried out.

Figure 4:
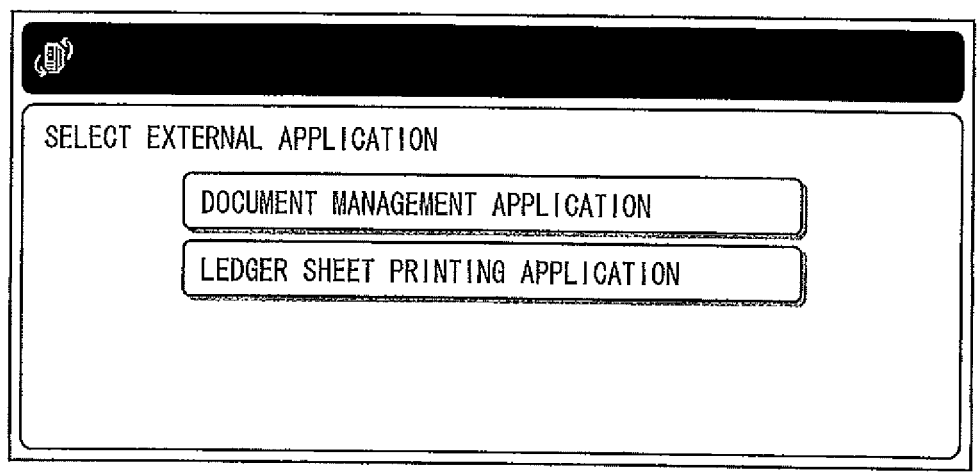
FIG. 4 is an explanatory view illustrating an example of an application selection screen displayed on a display section of the multifunction peripheral included in the multifunction peripheral system illustrated in FIG. 1.

Meanwhile, in a case where it is determined in S5 that the image sending mode has not been selected, the apparatus control section 16 (i) determines that the mode selected by the user is the OSA mode, (ii) generates user operation information indicating that the OSA mode has been selected, and (iii) sends this user operation information to the information processing apparatus 30 via the web browser section 18 and the communication section 17 (S8). Further, the apparatus control section 16 causes the display section 13 to display an application selection screen which allows the user to select a desired application from external applications available in the OSA mode (S9). For example, such an arrangement is possible in which (i) the information processing apparatus 30 (the web server section 32) that has received the user operation information indicating that the OSA mode has been selected generates screen data of a UI screen (application selection screen) showing a list of the available external applications and sends the screen data to the multifunction peripheral 10 and (ii) the apparatus control section 16 of the multifunction peripheral 10 causes the display section 13 to display the application selection screen in accordance with the screen data. FIG. 4 is an explanatory view illustrating an example of the application selection screen. As illustrated in FIG. 4, in the present embodiment, the document management application and the ledger sheet printing application are available in the OSA mode.

Thereafter, the apparatus control section 16 determines, in response to receipt of an application selection instruction from the user, whether or not an application selected by the user is the document management application (S10). In a case where it is determined that the document management 16 executes processing of the document management application in accordance with a control instruction from the document management application 33b that operates in the information processing apparatus 30 (S11), and then the process in S13 is carried out. Meanwhile, in a case where it is determined in S10 that the document management application has not been selected, the apparatus control section 16 determines that the ledger sheet printing application has been selected, and executes processing of the ledger sheet printing application in accordance with a control instruction from the ledger sheet printing application 33c that operates in the information processing apparatus 30 (S12), and then the process in S13 is carried out.

As has been described, in the present embodiment, the apparatus control section 16 generates user operation information indicative of a content of an operation input from a user and appropriately notifies the information processing apparatus 30 of the user operation information, regardless of whether processing to be executed is processing of the standard function or processing of the expanded function. This allows the manual display application 33a provided in the information processing apparatus 30 to control each application of the standard function and each application of the expanded function to display an operation manual corresponding to an operation input from the user. That is, in the present embodiment, the manual display application 33a common to all of the applications controls display of operation manuals of the respective applications regardless of an application to be executed is an application of the standard function or the expanded function. Details of display control of an operation manual are described later.

(1-3. Processing of Copy Mode)

Figure 5:
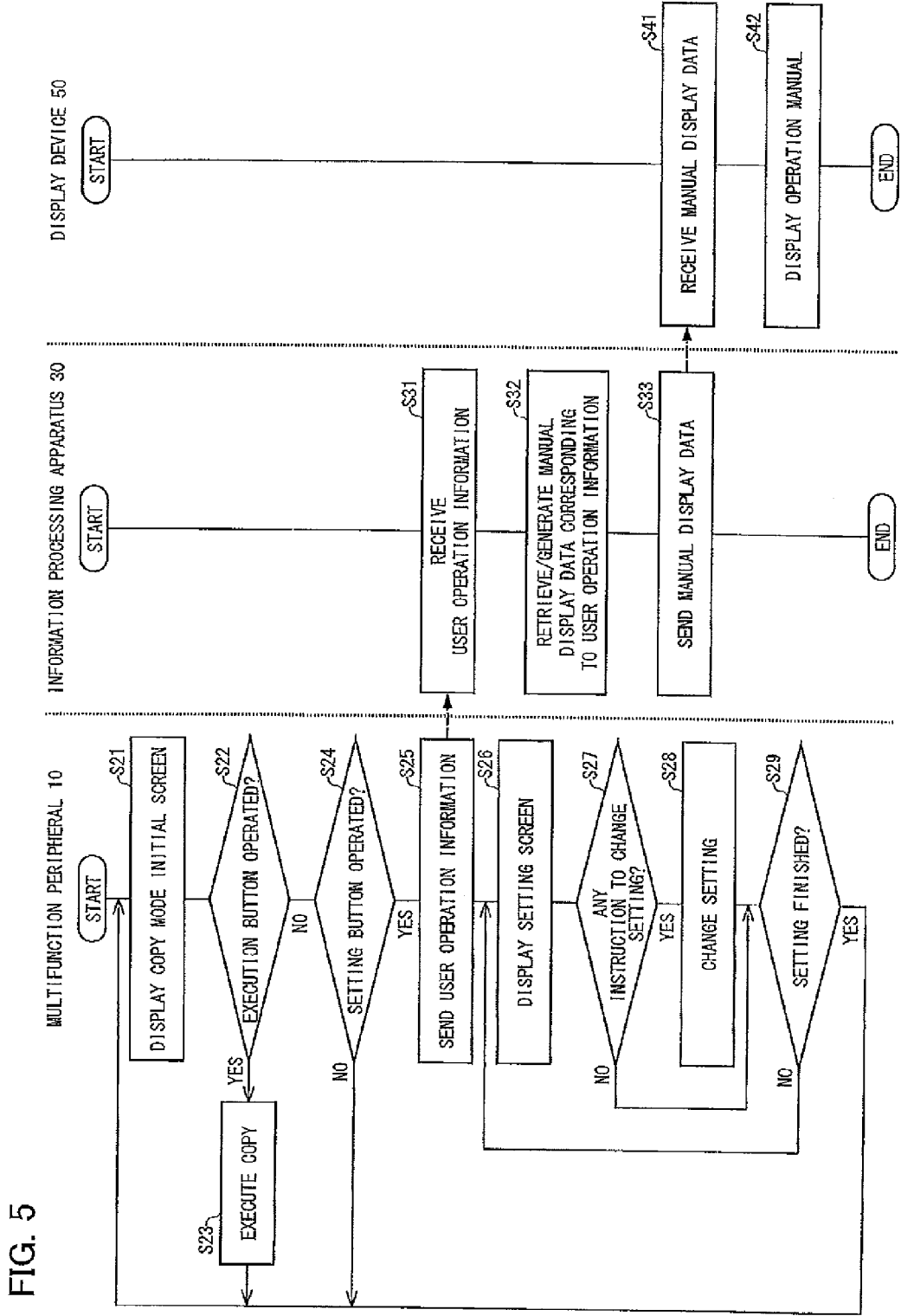
FIG. 5 is a flow chart showing a flow of processing carried out in a case where an operation manual concerning the copy mode is displayed on the display device in the multifunction peripheral control system illustrated in FIG. 1.
Figure 6:
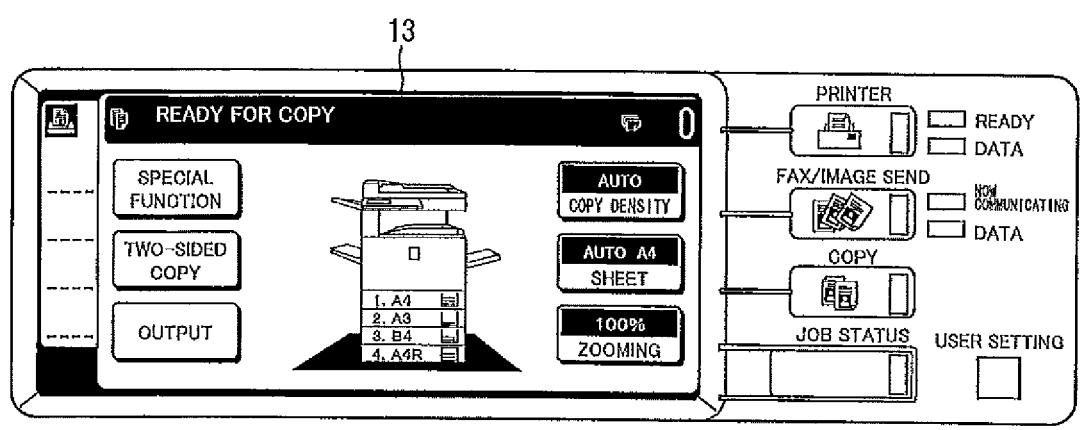
FIG. 6 is an explanatory view illustrating an example of an initial screen of the copy mode which initial screen is displayed on the display section of the multifunction peripheral in the processing shown in FIG. 5.

FIG. 5 is a flow chart showing a flow of processing in the multifunction peripheral control system 100 carried out in a case where an operation manual is displayed on the display device 50 in the copy mode. In a case where the copy mode is selected on the mode selection screen displayed in S1 of FIG. 2, the apparatus control section 16 of the multifunction peripheral 10 reads out initial screen data of the copy mode from the storage section (not illustrated) of the multifunction peripheral 10, and causes the display section 13 to display an initial screen in accordance with this initial screen data (S21). FIG. 6 is an explanatory view illustrating an example of the initial screen of the copy mode.

Next, the apparatus control section 16 determines whether or not an execution button has been operated (S22). In a case where it is determined that the execution button has been operated, copy processing based on a setting condition at that time is executed in accordance with the copy application included in the multifunction peripheral 10 (S23), and then the process in S21 is carried out again.

Meanwhile, in a case where it is determined in S22 that the execution button has not been operated, the apparatus control section 16 determines whether or not any of setting buttons has been operated (S24). In a case where it is determined that any of the setting buttons has not been operated, the apparatus control section 16 carries out the process in S21 again.

In a case where it is determined in S24 that any of the setting buttons has been operated, the apparatus control section 16 (i) sends user operation information corresponding to the setting button that has been operated to the information processing apparatus 30 via the web browser section 18 and the communication section 17 (S25), (ii) reads out, from the storage section (not illustrated) of the multifunction peripheral 10, a setting window (UI screen) corresponding to the setting button that has been operated, and (iii) causes the display section 13 to display the setting window (UI screen) (S26).

In the present embodiment, setting buttons of "Copy Density", "Sheet", "Zooming", "Special Function", "Two-Sided Copy", and "Output" are available, as illustrated in FIG. 6. The "Copy Density" button is a setting button for setting density of printing on a recording sheet. The "Sheet" button is a setting button for selecting size and type of a recording sheet. The "Zooming" button is a setting button for setting a size of a copied image (a ratio of the copied image to original image data). The "Two-Sided Copy" button is a setting button for selecting whether double-side copy is executed or single-side copy is executed. The "Output" button is a setting button for setting a destination of a recording sheet on which an image has been copied. The "Special Function" button is a setting button for a variety of settings other than these settings.

FIG. 7 illustrates an example of user operation information that is sent from the multifunction peripheral 10 to the information processing apparatus 30 in a case where the "Copy Density" button is operated in S24. As illustrated in FIG. 7, in the present embodiment, notification of user operation information (notification from the multifunction peripheral) in which "COPY" indicative of the copy mode is stored in the <Screen> tag and "EXPOSURE" indicating that an item to be set is "Copy Density" is stored as an identifier in the <Screen> tag is sent to the information processing apparatus 30. Note that a data format of the user operation information is not limited to XML, and can be, for example, HTML or other formats. In the present embodiment, the user operation information is information of a screen that is being displayed, a content of a button operated by a user, etc. However, the user operation information is not limited to these, provided that it allows a content of a user's operation to be identified. For example, ID information for identifying a screen or a button, coordinate information within a screen, etc. may be sent as the user operation information to the information processing apparatus 30.

Figure 8:
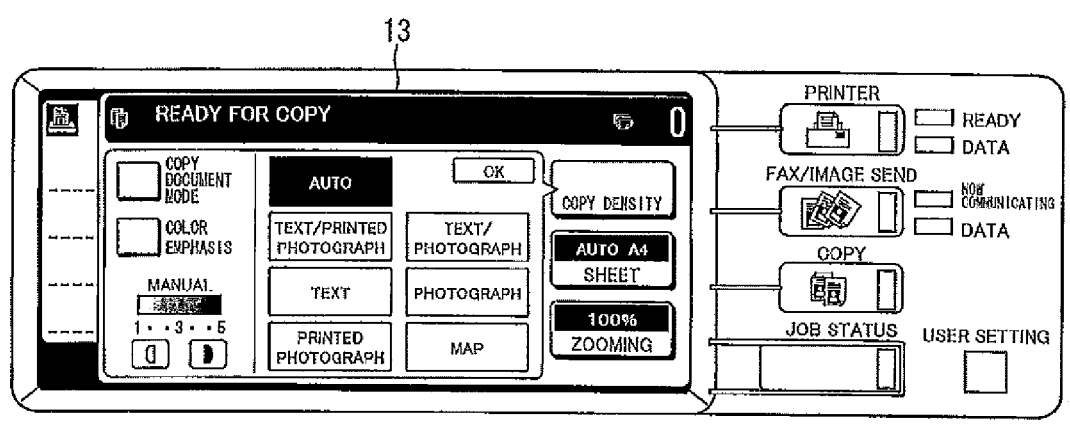
FIG. 8 is an explanatory view illustrating an example of a copy density setting window displayed on the display section of the multifunction peripheral in the processing shown in FIG. 5.

FIG. 8 illustrates an example of a setting window for "Copy Density" displayed on the display section 13 of the multifunction peripheral 10 in a case where the "Copy Density" button has been operated in S24.

When the communication section 31 receives the user operation information sent from the multifunction peripheral 10 (S31), the manual display application 33a of the information processing apparatus 30 retrieves (or generates) manual display data corresponding to the user operation information (S32), and sends the manual display data to the display device 50 via the communication section 31 (S33). Specifically, in the information processing apparatus 30, a table in which identification information (e.g., mode identification information, setting item identification information) contained in the user operation information sent from the multifunction peripheral 10 and manual display data are associated with each other in advance is stored in advance, and the manual display application 33a retrieves the manual display data by referring to the table. Alternatively, the manual display application 33a may generate the manual display data in accordance with the user operation information. For example, such an arrangement is possible in which (i) data of an operation manual described in a document format (e.g., a structured document in which sections and paragraphs are clearly defined and classified) such as HTML is stored, and (ii) the manual display application 33a generates manual display data by applying a style sheet (template of a way in which a document is displayed, in which template defines at least one of a font type, a character size, a character color, a line spacing, and a background color) to a part, corresponding to the user operation information, of the operation manual.

FIG. 9 is an explanatory view illustrating an example of the manual display data sent from the information processing apparatus 30 to the display device 50. In the data illustrated in FIG. 9, "Manual Data" in the <Screen> tag is a part in which image data of an operation manual and HTML screen data are stored.

When the communication section 51 receives the manual display data sent from the information processing apparatus 30 (S41), the apparatus control section 52 of the display device 50 causes the display section 53 to display an image corresponding to the manual display data (S42). FIG. 10 is an explanatory view illustrating an example of an operation manual (operation manual concerning density setting in the copy mode) displayed on the display section 53.

The apparatus control section 16 of the multifunction peripheral 10 determines whether or not a setting changing instruction from a user has been inputted to the setting window (S27). In a case where the setting changing instruction has been inputted, the apparatus control section 16 changes a setting content in accordance with the setting changing instruction (S28). Further, the apparatus control section 16 determines whether or not a display end instruction to end display of the setting window has been given by the user (S29). In a case where the display end instruction has not been given, the process in S26 is carried out again, whereas in a case where the display end instruction has been given, the process in S21 is carried out again.

Figure 11:
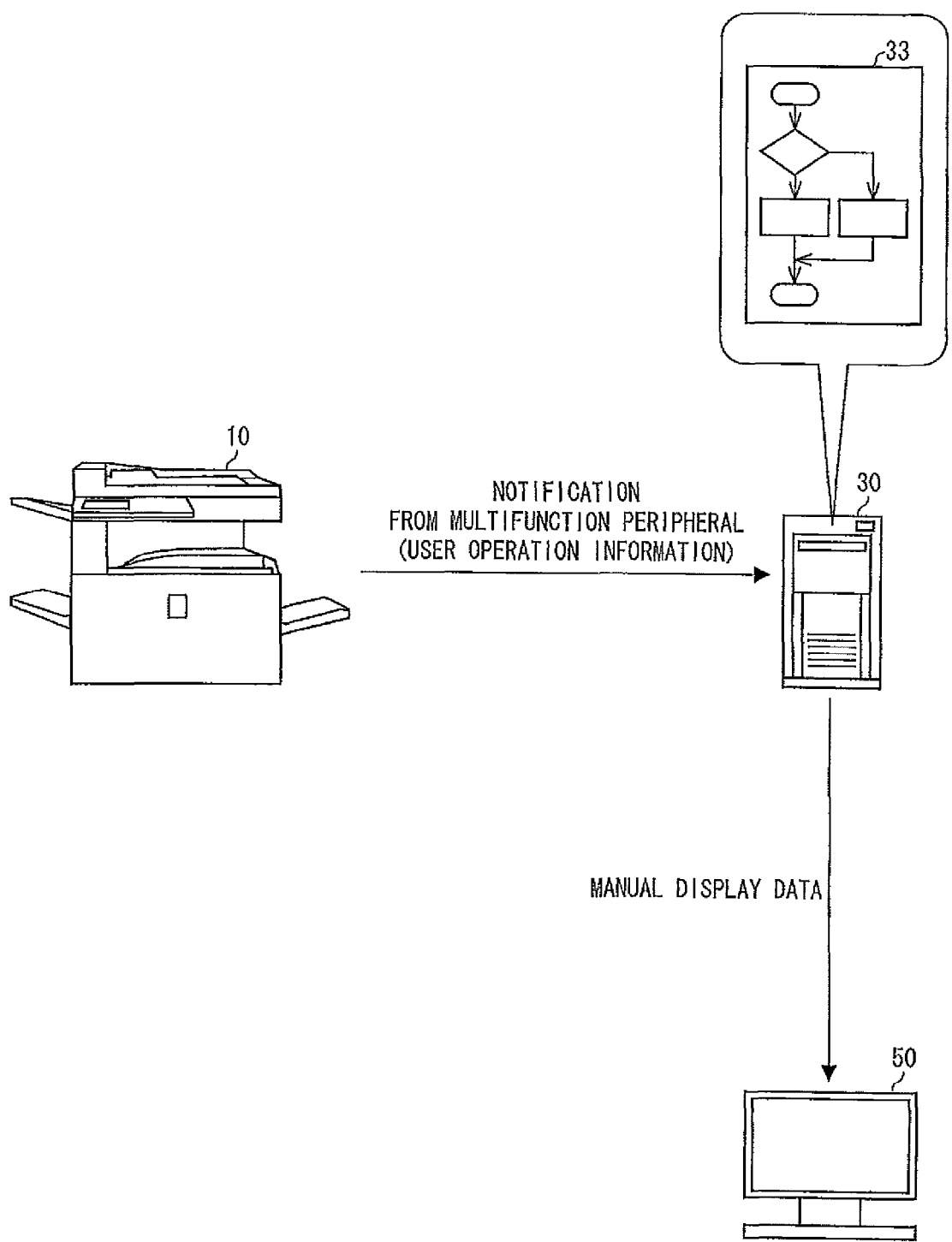
FIG. 11 is an explanatory view illustrating an outline of communication processing in the processing shown in FIG. 5.

FIG. 11 is an explanatory view schematically illustrating communication processing carried out among the multifunction peripheral 10, the information processing apparatus 30, and the display device 50 in the processing of the copy mode illustrated in FIG. 5. As illustrated in FIG. 11, when a user operates/selects a setting button on the multifunction peripheral 10, user operation information indicative of a content of the operation is sent from the multifunction peripheral 10 to the information processing apparatus 30 (notification from multifunction peripheral). The manual display application 33a that operates in the information processing apparatus 30 retrieves and generates manual display data corresponding to the user operation information received from the multifunction peripheral 10, and sends the manual display data to the display device 50. In this way, an operation manual corresponding to the user operation is displayed on the display device 50.

As has been described, in the present embodiment, when a user operates/selects a setting button, a setting window (UI screen) corresponding to the selected setting button is displayed on the display section 13, and an operation manual corresponding to the selected setting button is displayed on the display device 50. This allows the user to input setting on the setting window while referring to the operation manual displayed on the display section 53 as necessary.

The above description has dealt with a case where an operation manual is displayed on the display device 50 in the processing of the copy mode. However, the present embodiment is not limited to this. Alternatively, an operation manual may be displayed on the display section 13 of the multifunction peripheral 10.

Figure 12:
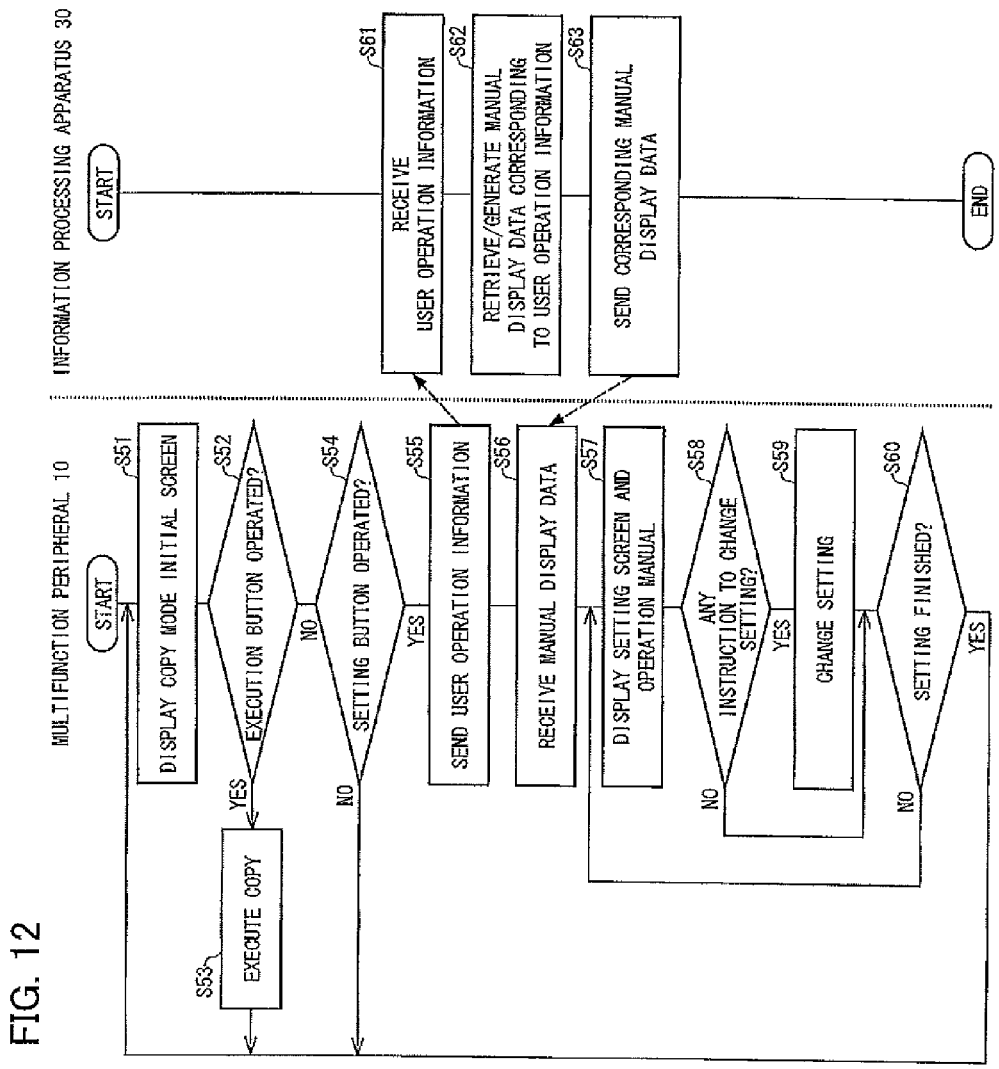
FIG. 12 is a flow chart showing a flow of processing carried out in a case where the operation manual concerning the copy mode is displayed on the display section of the multifunction peripheral in the multifunction peripheral control system illustrated in FIG. 1.

FIG. 12 is a flow chart showing a flow of processing in the multifunction peripheral control system 100 carried out in a case where an operation manual is displayed on the display section 13 of the multifunction peripheral 10 in the copy mode. In a case where the copy mode is selected on the mode selection screen displayed in S1 of FIG. 2, the apparatus control section 16 of the multifunction peripheral 10 reads out initial screen data of the copy mode from the storage section (not illustrated) of the multifunction peripheral 10, and causes the display section 13 to display an initial screen in accordance with the initial screen data (S51). The initial screen of the copy mode can be a screen similar to that illustrated in FIG. 6.

Next, the apparatus control section 16 determines whether or not an execution button has been operated (S52). In a case where it is determined that the execution button has been operated, copy processing based on a setting condition at that time is executed in accordance with the copy application included in the multifunction peripheral 10 (S53), and the process in S51 is carried out again.

Meanwhile, in a case where it is determined in S52 that the execution button has not been operated, the apparatus control section 16 determines whether or not any of the setting buttons has been operated (S54). In a case where it is determined that any of the setting buttons has not been operated, the apparatus control section 16 carries out the process in S51 again.

In a case where it is determined in S54 that any of the setting buttons has been operated, the apparatus control section 16 sends user operation information corresponding to the setting button that has been operated to the information processing apparatus 30 (S55). The user operation information can be user operation information similar to that described with reference to FIG. 5.

When the communication section 31 receives the user operation information sent from the multifunction peripheral 10 (S61), the manual display application 33a of the information processing apparatus 30 retrieves or generates manual display data corresponding to the user operation information (S62), and sends the manual display data to the display device 50 via the communication section 31 (S63).

In a case where data of an operation manual is stored in the information processing apparatus 30, the manual display data can be generated or retrieved in a similar manner to that described with reference to FIG. 5. Meanwhile, in a case where data of an operation manual is stored in the multifunction peripheral 10, page designation information indicating which page of the operation manual is to be displayed may be generated as the manual display data, and sent to the multifunction peripheral 10.

The manual display data may be generated, for example, by the following method. Specifically, (i) a table is stored in advance in which identification information (e.g., mode identification information, setting item identification information) contained in the user operation information sent from the multifunction peripheral 10 and page designation information indicating which page of which manual (or which part of which page) is to be displayed are associated with each other and (ii) the manual display application 33a retrieves the page designation information and generates the manual display data by referring to the table. FIG. 13 illustrates an example of the manual display data that is sent from the information processing apparatus 30 to the multifunction peripheral 10 in a case where page 26 of an operation manual is displayed.

Another arrangement is also possible in which (i) data of an operation manual described in a document format such as HTML is stored in the multifunction peripheral 10 and (ii) the manual display application 33a generates and sends manual display data including page designation information and a style sheet to be applied to display of the page designation information.

Further, another arrangement is also possible in which the manual display application 33a (i) acquires, from the multifunction peripheral 10, data of an operation manual corresponding to the page designation information, (ii) generates display screen data on the basis of the acquired data, and (iii) sends manual display data including the generated display screen data to the multifunction peripheral 10.

When the communication section 17 receives the manual display data sent from the information processing apparatus 30 (S56), the apparatus control section 16 of the multifunction peripheral 10 causes the display section 13 of the multifunction peripheral 10 to display an image of an operation manual corresponding to the manual display data and a setting window corresponding to the setting button that has been operated by the user and is detected in S54 (S57). The setting window can be a setting window similar to that described with reference to FIG. 5. The image of the operation manual can be an image similar to that of FIG. 10. Note that a display region of the setting window and a display region of the operation manual may be predetermined or may be designated by the manual display application 33a. In the present embodiment, the display section 13 has a horizontally-long rectangular shape, and a substantially left-half of the display section 13 in a longitudinal direction is predetermined as the display region (operation area) of the setting window and a substantially right-half of the display section 13 in the longitudinal direction is predetermined as the display region (manual display area) of the operation manual.

Thereafter, the apparatus control section 16 of the multifunction peripheral 10 determines whether or not a setting changing instruction from a user has been inputted to the setting window (S58). In a case where the setting changing instruction has been inputted, the apparatus control section 16 changes a setting content in accordance with the setting changing instruction (S59). Further, the apparatus control section 16 determines whether or not a display end instruction to end display of the setting window has been given by the user (S60). In a case where the display end instruction has not been given, the process in S57 is carried out again, whereas in a case where the display end instruction has been given, the process in S51 is carried out again.

Figure 14:
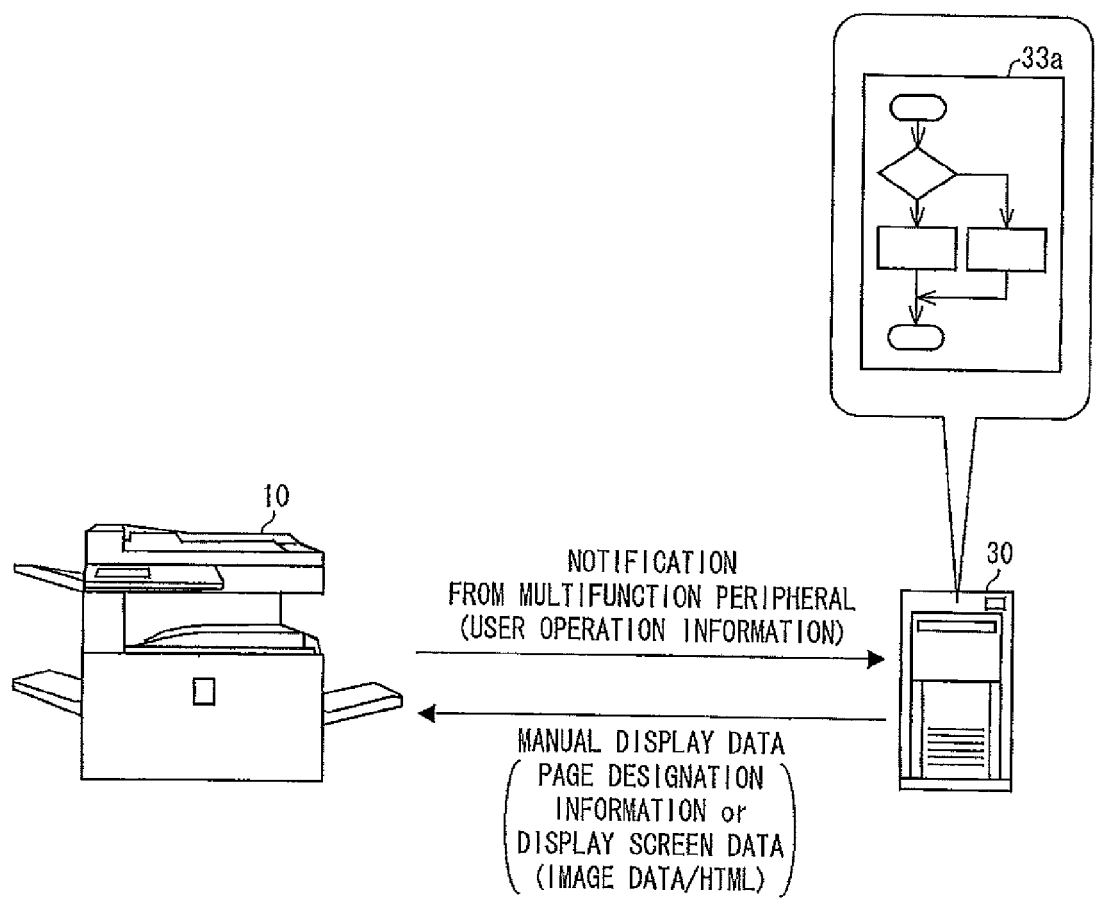
FIG. 14 is an explanatory view illustrating an outline of communication processing in the processing shown in FIG. 12.

FIG. 14 is an explanatory view schematically illustrating communication processing carried out between the multifunction peripheral 10 and the information processing apparatus 30 in the processing of the copy mode illustrated in FIG.

12. As illustrated in FIG. 14, when a user selects/operates a setting button of the multifunction peripheral 10, user operation information indicative of a content of the operation is sent from the multifunction peripheral 10 to the information processing apparatus 30 (notification from multifunction peripheral). The manual display application 33a that operates in the information processing apparatus 30 retrieves or generates manual display data (manual display data including page designation information or manual display data including display screen data (manual data (e.g., HTML screen data including an operation manual))) corresponding to the user operation information received from the multifunction peripheral 10, and then sends the manual display data to the multifunction peripheral 10. In this way, an operation manual corresponding to the user operation is displayed on the display section 13 of the multifunction peripheral 10.

Although the above description has mainly described a case where the processing of the copy mode is carried out, an operation manual is displayed in a substantially similar manner also in a case where processing of another standard function (e.g., image sending mode) is carried out. Further, although the above description has dealt with a case where setting of "Copy Density" is executed, an operation manual is displayed in a substantially similar manner also in a case where setting of another item (e.g., "Sheet", "Zooming", "Special Function", "Two-Sided Copy", "Output") is executed.

(1-4. Processing of OSA Mode)

Figure 15:
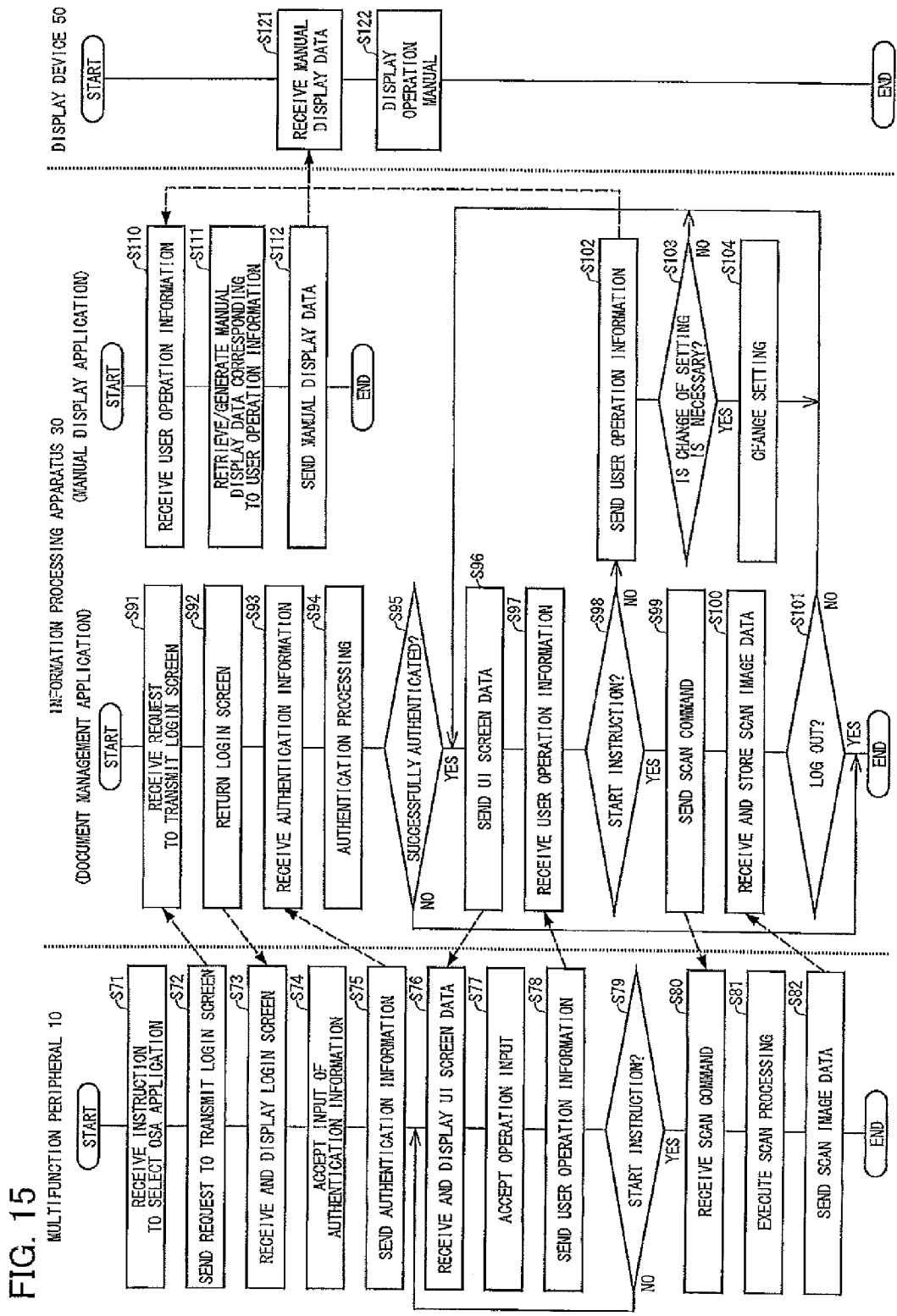
FIG. 15 is a flow chart showing a flow of processing carried out in a case where an operation manual concerning an external application is displayed on the display device in the multifunction peripheral control system illustrated in FIG. 1.

FIG. 15 is a flow chart showing a flow of processing in the multifunction peripheral control system 100 carried out in a case where an operation manual is displayed on the display device 50 in the OSA mode. FIG. 15 shows an example in which the document management application 33b, which is one of the external applications operating in the information processing apparatus 30, is selected. Although the following description deals with a case where the document management application 33b is selected, an operation manual is displayed in a substantially similar manner also in a case where another external application is executed.

In a case where an instruction to select the document management application 33b is accepted on the application selection screen (external application selection screen) illustrated in FIG. 4 (S71), the apparatus control section 16 of the multifunction peripheral 10 sends a request to transmit a login screen of the document management application 33b to the web server section 32 of the information processing apparatus 30 via the web browser section 18 and the communication section 17 (S72).

When the communication section 31 receives, from the multifunction peripheral 10, the request to transmit the login screen (S91), the web server section 32 of the information processing apparatus 30 acquires screen data of the login screen from the document management application 33b, and returns the screen data to the multifunction peripheral 10 via the communication section 31 (S92).

The apparatus control section 16 of the multifunction peripheral 10 receives the screen data of the login screen that is sent from the information processing apparatus 30 via the web browser section 18 and the communication section 17, and causes the display section 13 to display the login screen on the basis of the screen data (S73). FIG. 16 is an explanatory view illustrating an example of the screen data (HTML data constituting the screen data) of the login screen for the document management application which screen data is sent from the information processing apparatus 30 to the multifunction peripheral 10. FIG. 17 is an explanatory view illustrating the login screen that is displayed on the display section 13 of the multifunction peripheral 10 on the basis of this screen data. As illustrated in FIGS. 16 and 17, the login screen requests input of a login name and a password as authentication information.

The apparatus control section 16 of the multifunction peripheral 10 accepts the authentication information (here, a login name and a password) inputted by a user on the login screen (S74), and sends the authentication information to the information processing apparatus 30 via the web browser section 18 and the communication section 17 (S75). Specifically, the screen data that is sent in S92 from the information processing apparatus 30 to the multifunction peripheral 10 includes a destination address ("http://123.123.123.123/app/auth" in FIG. 16) of the authentication information as illustrated in FIG. 16. When the user inputs the authentication information and pushes a "LOGIN" button, the inputted authentication information is sent to the destination address. In this way, the authentication information inputted by the user of the multifunction peripheral 10 is sent to the information processing apparatus 30.

The document management application 33b receives the authentication information from the multifunction peripheral 10 via the communication section 31 and the web server section 32 (S93), and then carries out authentication processing by comparing the received authentication information and permitted authentication information which is stored in advance and which is authentication information for a user who is permitted to use the document management application 33b (S94). Then, it is determined on the basis of a result of the authentication processing whether or not use of the document management application 33b is permitted (S95), and in a case where it is determined that use of the document management application 33b is not permitted, the processing is finished. In this case, the multifunction peripheral 10 may be notified via the web server section 32 and the communication section 31 that use of the document management application 33b is not permitted (the inputted authentication information is not included in the permitted authentication information that is registered in advance). Alternatively, the login screen sent in S92 may be sent again to the multifunction peripheral 10 via the web server section 32 and the communication section 31 so that the user is requested to input the authentication information again.

In a case where it is determined in S95 that use of the document management application 33b is permitted, the document management application 33b sends UI screen data of the document management application to the multifunction peripheral 10 via the communication section 31 (S96).

Figure 18:
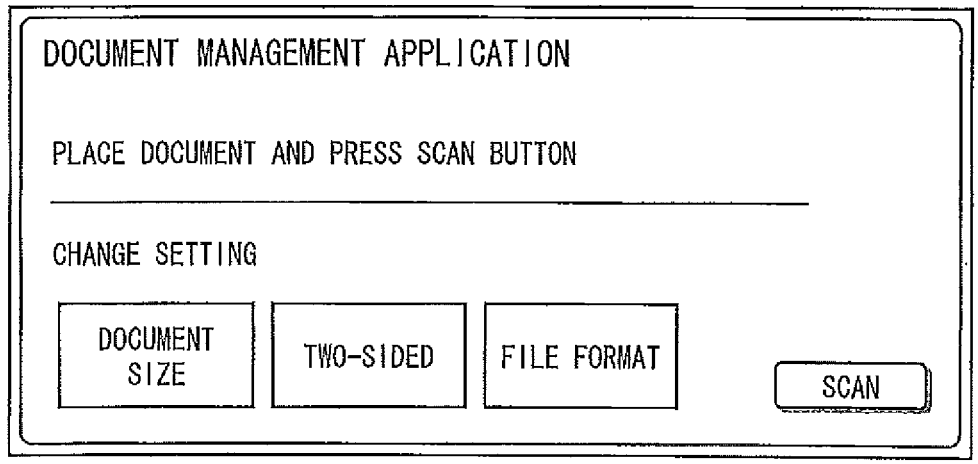
FIG. 18 (*a*) is an explanatory view illustrating an example of a UI screen displayed on the display section of the multifunction peripheral in the processing shown in FIG. 15.
Figure 18:
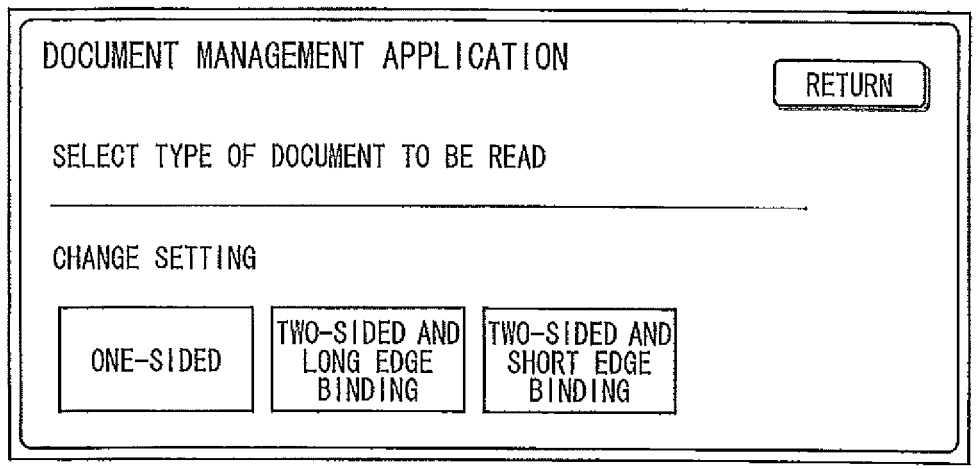

The apparatus control section 16 of the multifunction peripheral 10 receives the UI screen data that is sent from the information processing apparatus 30 via the communication section 17 and the web browser section 18, and then causes the display section 13 to display a UI screen corresponding to the UI screen data (S76). FIG. 18 (a) is an explanatory view illustrating an example of the UI screen of the document management application 33b which is displayed on the display section 13. In the example illustrated in FIG. 18 (a), the UI screen has a "Document Size" button, a "Two-Sided" button, a "File Format" button, and a "Scan" button. The "Scan" button is a button for inputting an instruction to start (execute) scan processing on the basis of setting at the time. The "Document Size" button is a button for setting a size of a document to be scanned. The "Two-Sided" button is a button for setting whether only one side of a document is read or both sides of the document is read, etc. The "File Format" button is a button for setting a file format of image data to be acquired by the scan processing.

Thereafter, the apparatus control section 16 of the multifunction peripheral 10 accepts user's operation input on the UI screen (S77), and sends user operation information corresponding to the user's operation input to the information processing apparatus 30 via the web browser section 18 and the communication section 17 (S78).

In the OSA mode, the apparatus control section 16 of the multifunction peripheral 10 controls display of a UI screen on the display section 13 and operations of the respective sections on the basis of screen data and control information that are sent from an external application. Accordingly, the apparatus control section 16 merely causes the display section 13 to display screen data that is acquired by the web browser section 18 from an external application, and does not grasp what kind of image is being displayed on the display section 13 and what kind of function is to be executed. On this account, in the OSA mode, the apparatus control section 16 cannot (i) analyze the user's operation input, (ii) generate information indicative of the user's operation input, and (iii) send the information to the information processing apparatus 30. Accordingly, the user operation information may be positional information indicative of a coordinate of a touched part on the display section 13 instead of a result of analysis of the user's operation. In this case, the external application analyses the user's operation (which button has been operated) on the basis of the positional information.

Another arrangement is also possible in which (i) each button displayed on the UI screen is associated with a destination address and user operation information that is sent in a case where the button is operated and (ii) user operation information corresponding to an operated button is sent to a destination address corresponding to the operated button. That is, while the multifunction peripheral 10 is operating under control of the external application, the external application itself can acquire user operation information on the basis of the way in which a content (e.g., screen data of various kinds, control instruction) sent to the multifunction peripheral 10 is described without the need for causing multifunction peripheral 10 to generate specialized user operation information. For example, in the screen data corresponding to the UI screen of FIG. 18 (*a*), the "Two-Sided" button may be associated with an address (e.g., link such as http://123.123.123.123/app/setting/duplex.html) to be accessed in a case where the "Two-Sided" button is operated. In this way, when the "Two-Sided" button is operated, a request is sent to the address to be accessed and the external application can detect a content of the user's operation.

After sending the user operation information in S78, the apparatus control section 16 determines whether or not the user operation information is an instruction to start the scan processing (operation of the "Scan" button on the UI screen illustrated in FIG. 18 (*a*)) (S79).

In a case where it is determined that the user operation information is an instruction to start the scan processing, the apparatus control section 16 (i) receives, via the communication section 17 and the web browser 18, scan command sent from the information processing apparatus 30 (the document management application 33*b*) (S80), (ii) executes processing corresponding to the scan command (S81), (iii) sends scanned image data (scan image data) to a destination address indicated in the scan command (S82), and then (iv) finishes the processing.

Meanwhile, in a case where it is determined that the user operation information is not an instruction to start the scan processing, the process in S76 is carried out, in which the apparatus control section 16 receives, via the communication section 17 and the web browser section 18, screen data of a UI screen sent from the information processing apparatus 30 (the document management application 33*b*), and then causes the display section 13 to display the UI screen corresponding to the screen data. For example, in a case where the "Two-Sided" button is operated on the UI screen illustrated in FIG. 18 (*a*), user operation information indicative of the operation is sent to the information processing apparatus 30 (the document management application 33*b*), and a UI screen illustrated in FIG. 18 (*b*) is displayed on the display section 13 on the basis of screen data of the UI screen which is returned from the information processing apparatus 30 (the document management application 33*b*) to the multifunction peripheral 10 in response to the user operation information. Note that in this screen data, each button included in the UI screen is associated with information indicative of an address to be accessed in a case where the button is operated. For example, a "Two-Sided and Long Edge Binding" button is associated with a request URL of http://123.123.123.123/app/setting/duplex.html?selected=dupBooklet as information indicative of the address to be accessed. Further, the request URL is given a query "selected", and the document management application 33*b* can know that "Two-Sided and Long Edge Binding" has been selected, by referring to this set value. Note that the document management application 33*b* which has acquired the set value changes setting to be applied to document management processing to "Two-Sided and Long Edge Binding" accordingly and sends, to the multifunction peripheral 10, screen data for displaying the UI screen of FIG. 18(*a*) again.

The document management application 33*b* receives operation input information sent from the multifunction peripheral 10 via the communication section 31 and the web server section 32 (S97), and determines, on the basis of the operation input information whether or not the operation of the user of the multifunction peripheral 10 is a start instruction (operation of the "Scan" button on the UI screen illustrated in FIG. 18 (*a*)) (S98).

In a case where it is determined that the operation of the user of the multifunction peripheral 10 is the start instruction, the document management application 33*b* creates a scan command for causing the multifunction peripheral 10 to carry out scan processing on the basis of setting at the time, and sends the scan command to the multifunction peripheral 10 via the web server section 32 and the communication section 31 (S99).

Thereafter, the document management application 33*b* receives, via the communication section 31 and the web server section 32, scan image data that is acquired from the multifunction peripheral 10 as a result of the scan processing based on the scan command, and then causes the scan image data to be stored in a predetermined place (S100).

Then, the document management application 33*b* determines whether to logout or not (S101). In a case where logout is selected, the process in S96 is carried out again, in which the UI screen (e.g., the UI screen illustrated in FIG. 18 (*a*)) is sent to the multifunction peripheral 10. Meanwhile, in a case where it is determined that logout is selected, the document management application 33*b* carries out predetermined logout processing (S104), and finishes its operation.

Meanwhile, in a case where it is determined in S98 that the operation of the user of the multifunction peripheral 10 is not a start instruction, the document management application 33*b* sends (transmits) user operation information (or notification corresponding to the user operation information; notification from OSA) to the manual display application 33*a* (S102), and determines whether or not the user operation requires change of setting of processing of the application (S103). For example, in a case where the "Document Size" button, the "Two-Sided" button, or the "File Format" button is operated on the UI screen of FIG. 18 (a), the document management application 33b determines that the operation is a UI screen update instruction which does not require change of setting. Note that the user operation information (notification from OSA) sent from the information processing apparatus 30 to the display device 50 can be, for example, information in the XML format, HTML format, or other format, as with the user operation information (notification from multifunction peripheral) sent from the multifunction peripheral 10 to the information processing apparatus 30.

Figure 19:
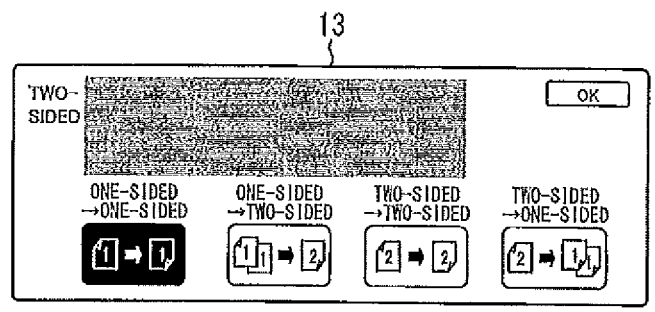
FIG. 19 (*a*) is an explanatory view illustrating an example of a UI screen displayed on the display section of the multifunction peripheral in the processing shown in FIG. 15.
Figure 19:
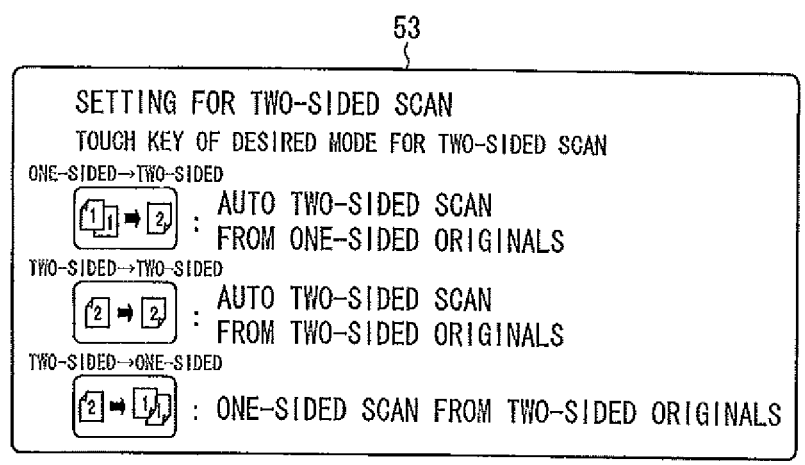

In a case where it is determined in S103 that the operation is not an instruction which requires change of setting, the process in S96 is carried out, in which the document management application 33b sends screen data of a UI screen corresponding to a button that has been operated to the multifunction peripheral 10 via the web server section 32 and the communication section 31. In this way, the apparatus control section 16 of the multifunction peripheral 10 updates the UI screen displayed on the display section 13 on the basis of the screen data received from the information processing apparatus 30 (S76). For example, in a case where the "Two-Sided" button is operated on the UI screen illustrated in FIG. 18 (a), the UI screen illustrated in FIG. 19(a) which is a UI screen by which setting concerning two-sided scan is inputted is displayed on the display section 13.

Meanwhile, in a case where it is determined in S103 that the operation is an instruction which requires change of setting, the document management application 33b changes setting on the basis of the user operation information (S104), and then the process in S96 is carried out, in which the document management application 33b sends, to the multifunction peripheral 10 via the web server section 32 and the communication section 31, screen data of a UI screen to be displayed after the change of setting.

Further, the manual display application 33a which operates in the information processing apparatus 30 receives the user operation information (notification from OSA) from the document management application 33b (S110), retrieves (or generates) manual display data corresponding to the user operation information (S111), and sends the manual display data to the display device 50 via the communication section 31 (S112). The manual display data can be retrieved (or generated) in a substantially similar manner to that in the case of the copy mode.

The communication section 51 receives the manual display data sent from the information processing apparatus 30 (S121). In response to this, the apparatus control section 52 of the display device 50 causes the display section 53 to display an image corresponding to the manual display data (S122). In this way, for example, in a case where the "Two-Sided" button is operated on the UI screen illustrated in FIG. 18 (a), an operation manual illustrated in FIG. 19 (b) is displayed on the display section 53 of the display device 50. That is, a UI screen (see FIG. 19 (a)) for accepting operation input concerning two-sided scan is displayed on the display section 13 of the multifunction peripheral 10, whereas an operation manual (see FIG. 19 (b)) concerning the two-sided scan is displayed on the display section 53 of the display device 50. This allows a user to input operation on the UI screen displayed on the display section 13 while referring to the operation manual displayed on the display section 53 of the display device 50.

Figure 20:
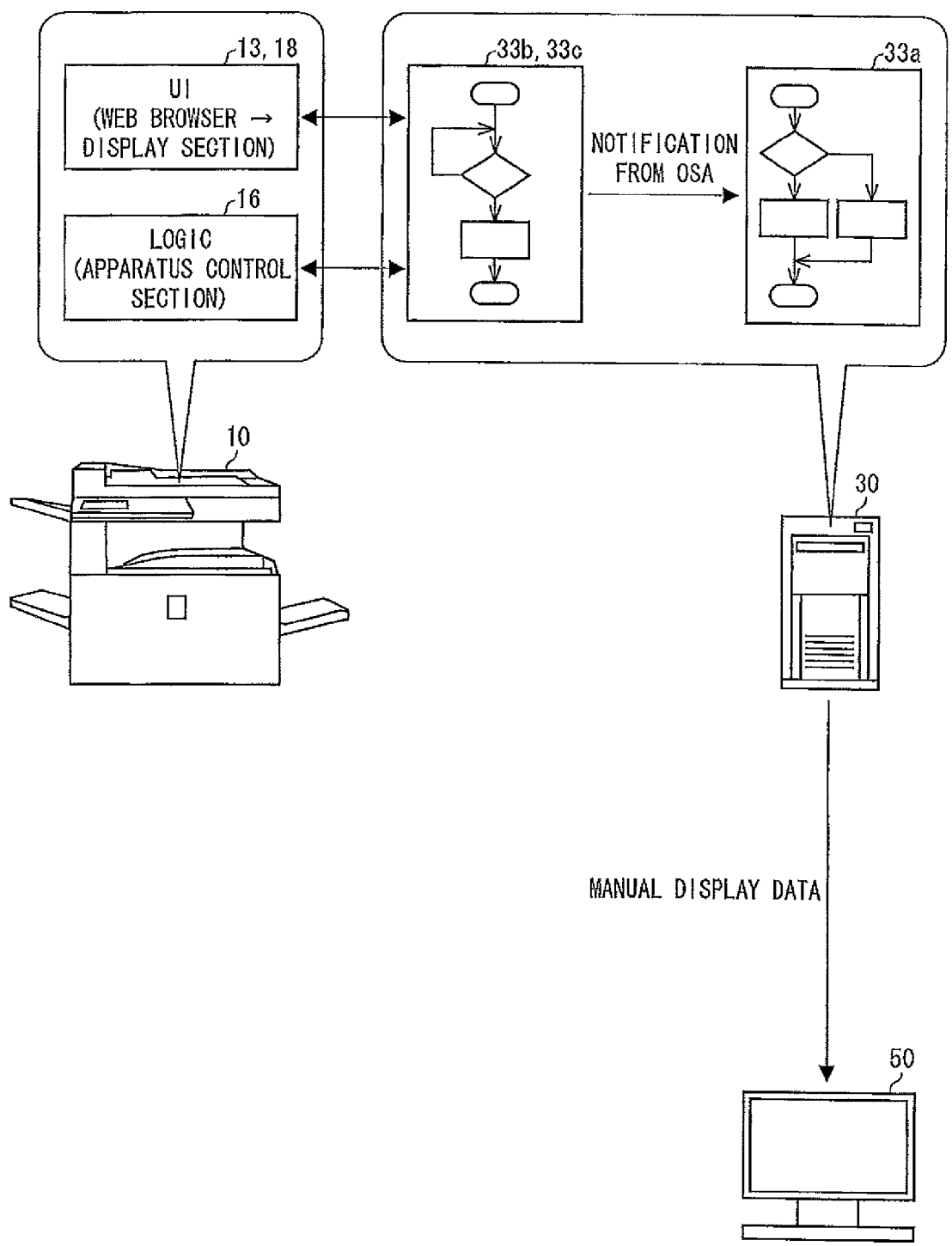
FIG. 20 is an explanatory view schematically illustrating communication processing carried out among the multifunction peripheral, the information processing apparatus, and the display device in the processing shown in FIG. 15.

FIG. 20 is an explanatory view schematically illustrating communication processing carried out among the multifunction peripheral 10, the information processing apparatus 30, and the display device 50 in the processing (document management processing) of the OSA mode illustrated in FIG. 15. As illustrated in FIG. 20, when a user selects a setting button of the multifunction peripheral 10, (i) user operation information indicative of this operation is sent from the multifunction peripheral 10 to the information processing apparatus 30, (ii) screen data of a UI screen corresponding to the user operation information is sent from the document management application 33b (OSA application) operating in the information processing apparatus 30 to the multifunction peripheral 10, and (iii) the user operation information is sent from the document management application 33b (OSA application) to the manual display application 33a. The manual display application 33a that has received the user operation information sends, to the display device 50, manual display data for displaying an operation manual corresponding to the user operation information.

As described above, when a user operates a UI screen, another UI screen corresponding to a content of this operation is displayed on the display section 13, and an operation manual corresponding to the content of the operation is displayed on the display device 50. This allows the user to input setting on the UI screen by referring to, as necessary, the operation manual displayed on the display section 53 of the display device 50.

The above description has dealt with a case where an operation manual is displayed on the display device 50 in the processing of the OSA mode. However, the present embodiment is not limited to this, and an operation manual may be displayed on the display section 13 of the multifunction peripheral 10.

Figure 21:
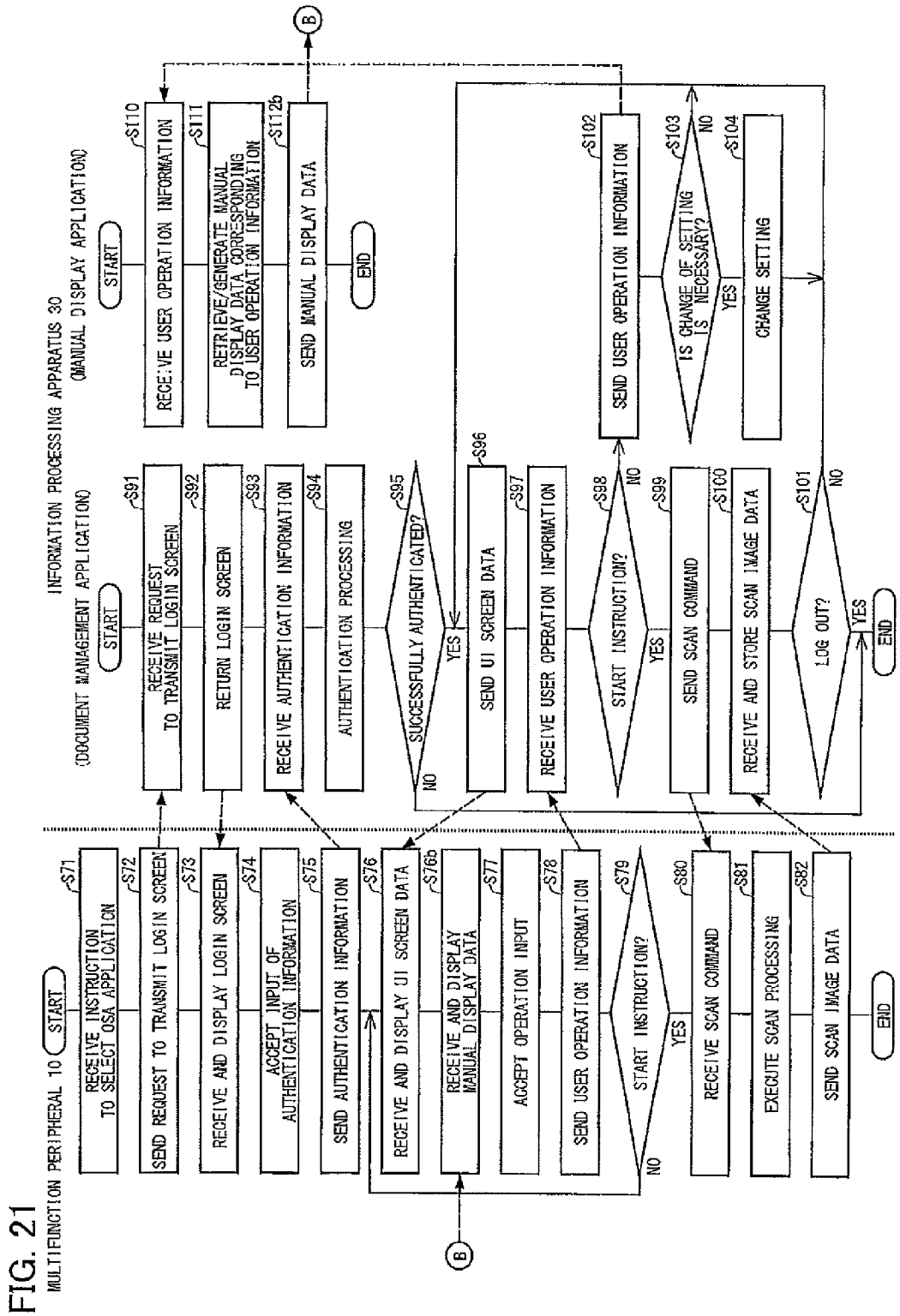
FIG. 21 is a flow chart showing a flow of processing carried out in a case where an operation manual concerning an external application is displayed on the display section of the multifunction peripheral in the multifunction peripheral control system illustrated in FIG. 1.

FIG. 21 is a flow chart showing a flow of processing of the multifunction peripheral control system 100 carried out in a case where an operation manual is displayed on the display section 13 of the multifunction peripheral 10 in the OSA mode. FIG. 21 shows an example in which the document management application 33b, which is one of the external applications operating in the information processing apparatus 30, has been selected. For convenience of description, identical processes (steps) to those in the flow chart of FIG. 15 are given identical numerals, and are not explained repeatedly.

The processing of FIG. 21 is different from that of FIG. 15 in that (i) the manual display application 33a carries out a process in Step S112b instead of the process in Step S112 of FIG. 15 and (ii) the apparatus control section 16 of the multifunction peripheral 10 carries out a process in Step S76b between Step S76 and Step S77.

In Step S112b, the manual display application 33a sends, to the multifunction peripheral 10 via the communication section 31, manual display data corresponding to user operation information (notification from OSA) received from the document management application 33b (S112b). Note that the manual display data can be retrieved (or generated) in a substantially similar manner to that of the case of the copy mode.

In Step S76b, the apparatus control section 16 receives, via the communication section 17 and the web browser section 18, the manual display data sent from the information processing apparatus 30 (the manual display application 33a), and causes the display section 13 to display an operation manual in accordance with the manual display data (S76b).

Figure 22:
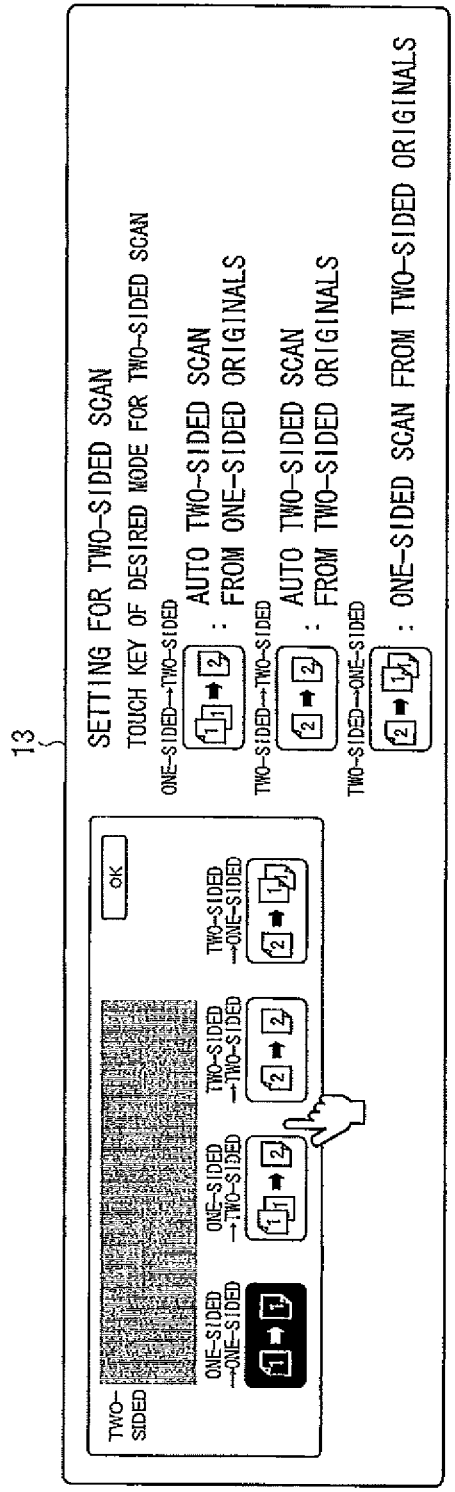
FIG. 22 is an explanatory view illustrating an example of a display screen (display screen including a UI screen and an operation manual) displayed on the display section in a case where a "Two-Sided" button on the UI screen has been operated in the processing shown in FIG. 21.

FIG. 22 is an explanatory view illustrating an example of a display screen displayed on the display section 13 in a case where the "Two-Sided" button has been operated on the UI screen illustrated in FIG. 18 (a). As illustrated in FIG. 22, the UI screen corresponding to the screen data of the UI screen received in S76 is displayed on one part of the display section 13, and the operation manual corresponding to the manual display data received in S76b is displayed on another part of the display section 13.

Figure 23:
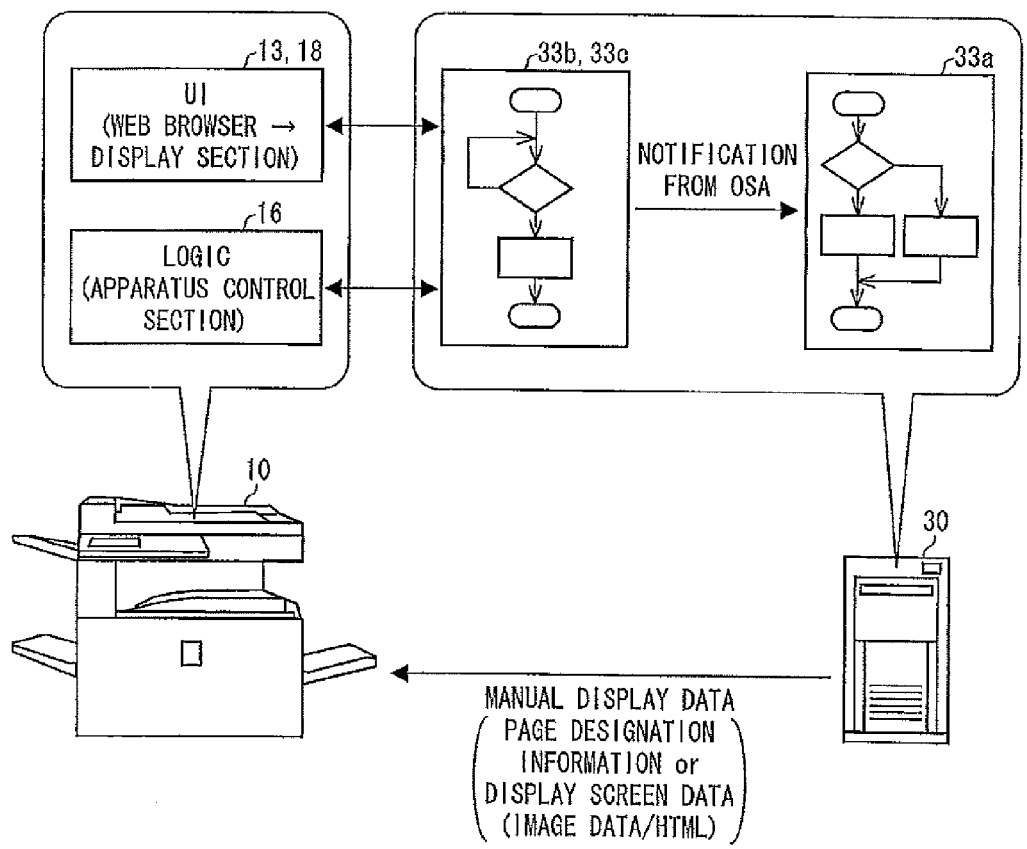
FIG. 23 is an explanatory view schematically illustrating communication processing carried out between the multifunction peripheral and the information processing apparatus in the processing shown in FIG. 21.

FIG. 23 is an explanatory view schematically illustrating communication processing carried out between the multifunction peripheral 10 and the information processing apparatus 30 in the processing (document management processing) of the OSA mode illustrated in FIG. 21. As illustrated in FIG. 23, when a user selects/operates a setting button of the multifunction peripheral 10, (i) user operation information indicative of the operation is sent from the multifunction peripheral 10 to the information processing apparatus 30, (ii) screen data of a UI screen corresponding to the user operation information is sent from the document management application 33b (OSA application) operating in the information processing apparatus 30 to the multifunction peripheral 10, and (iii) the user operation information is sent from the document management application 33b (OSA application) to the manual display application 33a. The manual display application 33a that has received the user operation information sends, to the multifunction peripheral 10, manual display data for displaying an operation manual corresponding to the user operation information.

As described above, when a user operates a UI screen, another UI screen corresponding to a content of this operation is displayed on one part of the display section 13, and an operation manual corresponding to the content of the operation is displayed on another part of the display section 13. This allows the user to input setting on the UI screen displayed on one part of the display section 13 by referring to the operation manual displayed on another part of the display section 13.

Note that in a case where the manual display data is not received from the information processing apparatus 30 (the manual display application 33a), the process in Step S77 is carried out after the process in Step S76 without carrying out the process in Step S76b. In this case, the UI screen (e.g., the UI screen illustrated in FIG. 18 (a)) received in Step S76 is displayed on the display section 13.

By the way, in the manual display processing, in a case where an identical operation manual is continuously displayed for a long period of time on the display section 13 of the multifunction peripheral 10 or on the display section 53 of the display device 50, troubles such as burn-in of a display screen would occur. For the purpose of preventing such troubles, in a case where a state in which an identical operation manual is displayed continues for a predetermined period of time, the manual display application 33a may change display of a manual display region of the display section 13 or the display section 53 to predetermined display (e.g., advertisement information, message information, event information, company bulletin board information, moving image, still image, part of the operation manual different from part that is being displayed, non-display state). For example, it is possible to employ an arrangement in which, in a case where it is determined that no operation has been made by a user for a predetermined period of time from the latest input, the apparatus control section 16 of the multifunction peripheral 10 sends neglected state notification (e.g., notification of FIG. 24) indicative of this state as user operation information (notification from multifunction peripheral) to the manual display application 33a, and the manual display application 33a which has received this notification sends manual display data for performing the predetermined display instead of the operation manual that is being displayed. This makes it possible to prevent the troubles such as burn-in of a display screen. Further, in a case where information such as advertisement information or message information is displayed as the predetermined display, the display section 13 of the multifunction peripheral 10 or the display section 53 of the display device 50 can be more effectively utilized.

Figure 25:
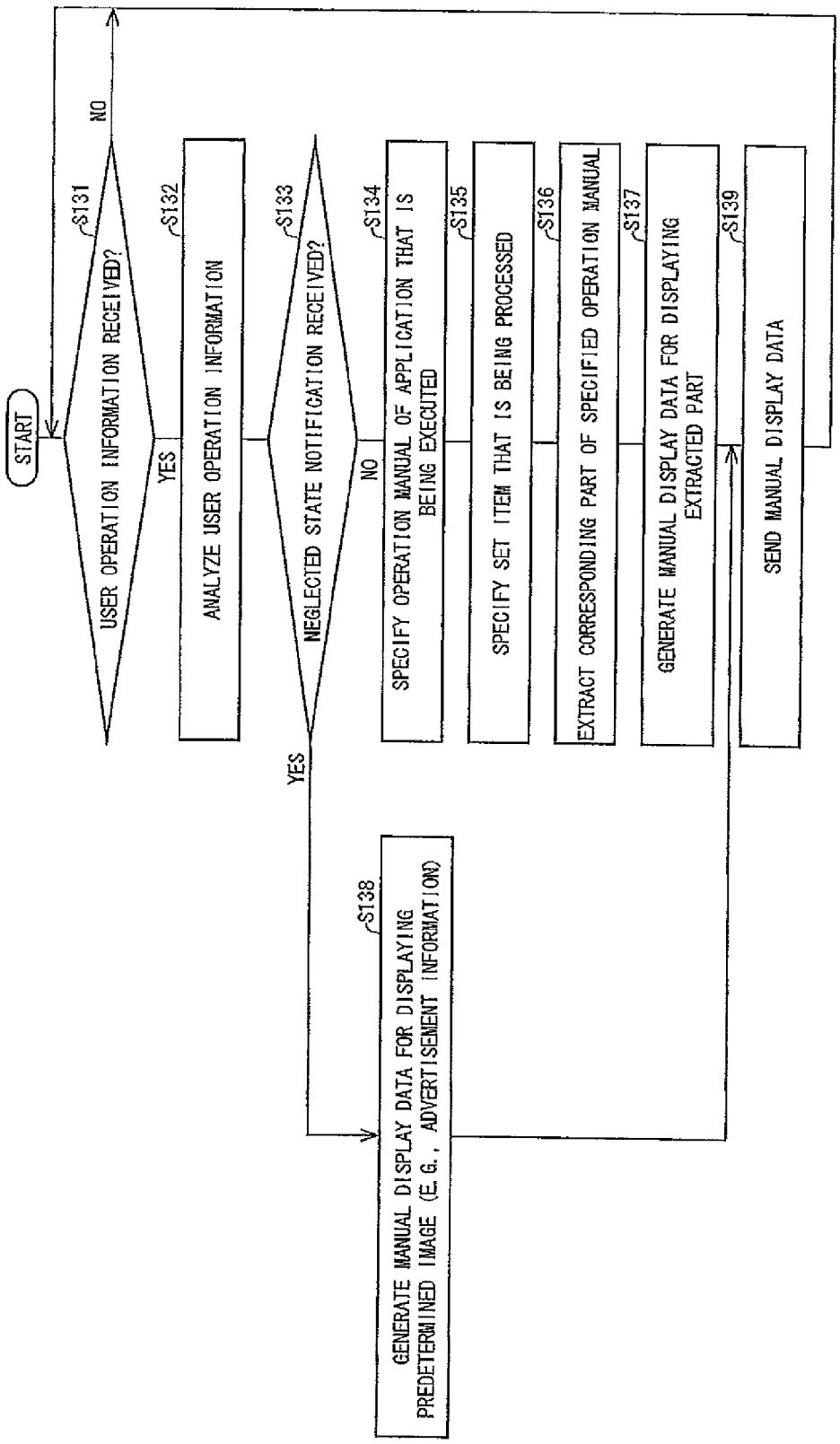
FIG. 25 is an explanatory view showing a flow of processing of a manual control application included in the multifunction peripheral control system illustrated in FIG. 1.

Next, the following describes in more detail how the manual display application 33a controls display of an operation manual. FIG. 25 is a flow chart showing a flow of processing in the manual display application 33a.

The manual display application 33a monitors whether or not user operation information has been received from the multifunction peripheral 10 or the OSA application (the document management application 33b or the ledger sheet printing application 33c) (S131).

In a case where it is determined that the user operation information has been received, the manual display application 33a analyses the user operation information (S132), and determines whether or not the user operation information is neglected state notification (notification that no operation has been made by a user for a predetermined period of time) (S133).

In a case where it is determined that the user operation information is not the neglected state notification, the manual display application 33a specifies an application that is being executed and an operation manual corresponding to the application on the basis of the user operation information (S134). For example, in the present embodiment, the manual display application 33a specifies which of the copy mode, the image sending mode, the document management application 33b, and the ledger sheet printing application 33c is being executed, and specifies an operation manual corresponding to the application that is being executed.

Further, the manual display application 33a specifies, on the basis of the user operation information, a set item (UI screen that is being displayed on the display section 13 of the multifunction peripheral 10) that is being processed by a user of the multifunction peripheral 10 (S135). The set item is, for example, "Copy Density", "Sheet", "Zooming", "Special Function", "Two-Side Copy", "Output", or the like in the case of the copy mode (standard function). Meanwhile, in the case of the document management application 33b, the set item is "Document Size", "Two-Sided", "File Format", or the like.

Next, the manual display application 33a retrieves (extracts), from the operation manual specified in S134, a part corresponding to the set item specified in S135 (S136), and generates manual display data for displaying the extracted part on the manual display region of the display section 13 or the display section 53 (S137).

Meanwhile, in a case where it is determined in S133 that the user operation information is the neglected state notification, the manual display application 33a generates manual display data for displaying a predetermined image (e.g., advertisement information) on the manual display region of the display section 13 or the display section 53 (S138).

Thereafter, the manual display application 33a sends, to the multifunction peripheral 10 or the display device 50, the manual display data generated in S137 or S138 (S139), and the process in S131 is carried out again.

Note that in order to achieve uniformity in appearance of displayed manuals, it is possible to employ an arrangement in which (i) a content of an operation manual of each application is created and stored in a document format (e.g., a structured document format in which section and paragraph are clearly defined and classified) such as HTML, and (ii) a predetermined style sheet (template of a manner in which a document is displayed in which template at least one of a font type, a character size, a character color, a line spacing, and a background color is defined (e.g., CSS (cascading style sheets))) is applied to the content of the operation manual at the time of generating the manual display data.

Figure 26:
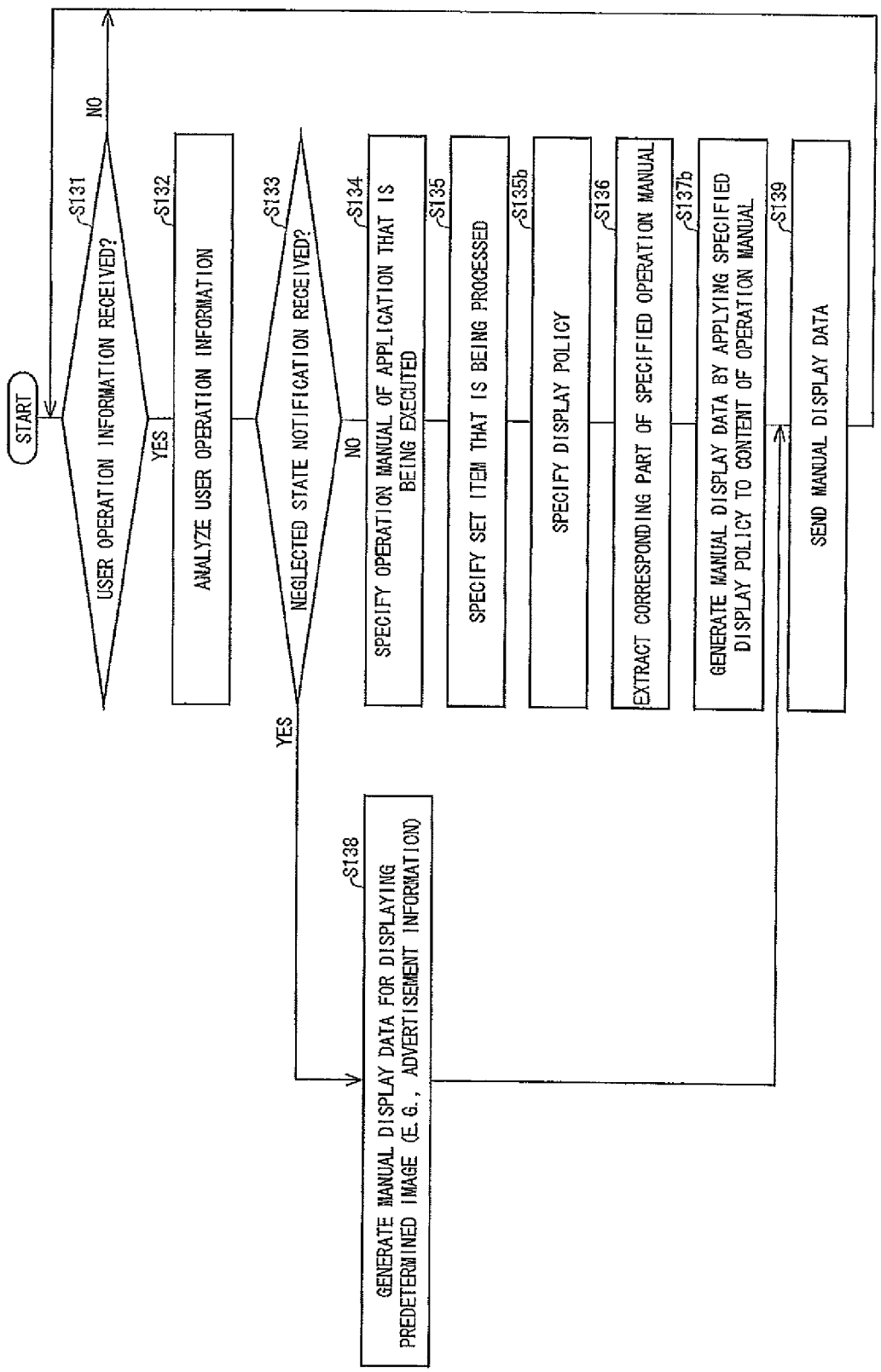
FIG. 26 is an explanatory view illustrating a modification of processing of the manual control application included in the multifunction peripheral control system illustrated in FIG. 1.

In this case, an identical style sheet (display policy) need not necessarily be applied to all of the applications. A different style sheet may be applied to one or more of the applications so that operation manuals are displayed in various ways. FIG. 26 is a flow chart showing a flow of processing in the manual display application 33a carried out in a case where manual display data is generated with the use of a style sheet. For convenience of description, identical processes (steps) to those in the flow chart of FIG. 25 are given identical numerals, and are not explained repeatedly.

The processing in FIG. 26 is different from that of FIG. 25 in that (i) the manual display application 33a carries out a process in Step S135b after the process in Step S135 in FIG. 25 and (ii) the manual display application 33a carries out a process in S137b instead of the process in S137.

In S135b, the manual display application 33a specifies a display policy (display rule specifying at least one of a font type, a character size, a character color, a line spacing, and a background color) corresponding to a source of the user operation information (an application that is being executed) (S135b). For example, it is possible to employ an arrangement in which (i) each application of the standard function and of the expanded function and a display policy to be displayed in a case where an operation manual of the application is displayed are associated with each other in advance and stored in the storage section (not illustrated) of the information processing apparatus 30 as illustrated in FIG. 27 and (ii) a display policy corresponding to an application that is being executed is retrieved. In the example illustrated in FIG. 27, a common display policy 1 (style sheet 1) is applied to the applications of the standard function (the copy mode and the image sending mode) and to the document management application out of the expanded function, and a display policy 2 (style sheet 2) is applied to the ledger sheet printing application of the expanded function. The display policy 2 is same as the display policy 1 in setting of a font size, but is different from the display policy 1 in setting of the other items (font type, font color, background color).

In S137b, the manual display application 33a generates manual display data by applying the display policy (style sheet) specified in S135b to a part of the operation manual which part has been extracted in S136 and corresponds to the user operation (S137b).

In this way, the operation manuals of the respective applications are displayed in accordance with a common display policy. Alternatively, the operation manuals of the respective applications are displayed in such a manner that one or more of the display set items (e.g., font size, font type, font color, background color, etc.) is set in an identical manner for all of the applications and the other display set items are set differently for the applications. That is, the operation manuals of the respective applications can be displayed in a unified manner.

As described above, in the multifunction peripheral control system 100 of the present embodiment, the manual display application 33a which operates in the information processing apparatus 30 controls both of (i) manual display of the standard function of the multifunction peripheral 10 and (ii) manual display of the expanded function of the multifunction peripheral 10. That is, the manual display application 33a controls display of an operation manual on the basis of notification of user operation information from the multifunction peripheral 10 or an external application (OS application), regardless of whether processing that is being executed in the multifunction peripheral 10 is the standard function or the expanded function.

This allows the operation manuals of the respective applications for executing the standard function and the expanded function to be displayed in a unified manner. Further, since the information processing apparatus 30 controls manual display, it is easy to change a display content (e.g., description of a manual, setting of manual display). Especially in a case where the information processing apparatus 30 is connected to a plurality of multifunction peripherals 10 or a plurality of display devices 50 via a communication network such as Internet, the information processing apparatus 30 can be easily connected to the plurality of multifunction peripherals 10 or the plurality of display devices 50, and a serviceman can easily change a display content of a manual without visiting places where the plurality of multifunction peripherals 10 and the plurality of display devices 50 are placed.

Figure 28:
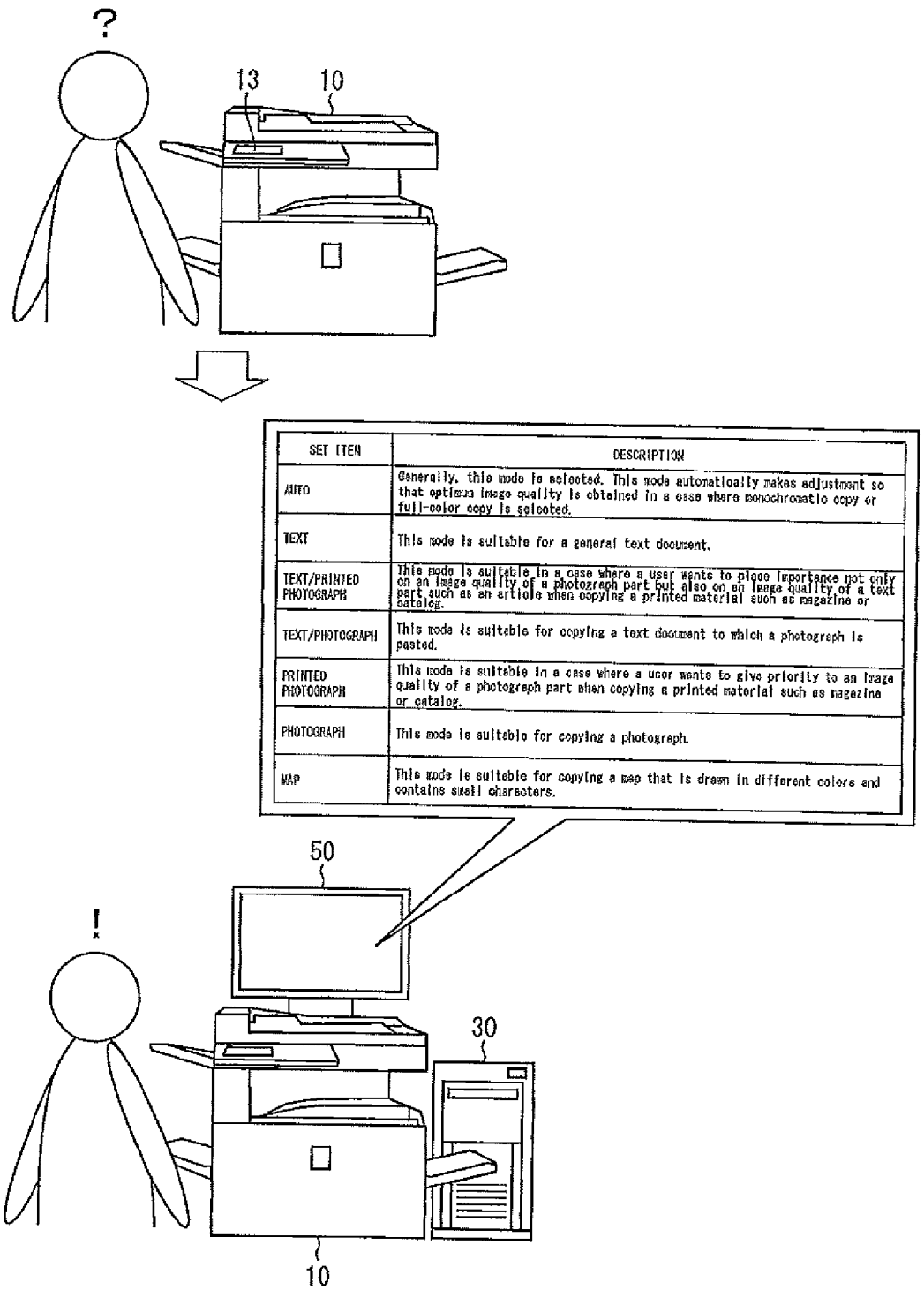
FIG. 28 is an explanatory view illustrating a state in which an operation manual is displayed on the display device in the multifunction peripheral control system illustrated in FIG. 1.

Further, in the present embodiment, in a case where the display device 50 is provided in the vicinity of the multifunction peripheral 10, the manual display application 33a causes the display section 53 of the display device 50 to display an operation manual. With the arrangement, even in a case where it is difficult for a user to grasp how to operate the multifunction peripheral 10 only by display of the display section 13 of the multifunction peripheral 10 (see the left side of FIG. 28), the user can easily grasp how to operate the multifunction peripheral 10 because operation manuals corresponding to respective set items on a UI screen that is being displayed on the display section 13 are displayed on the display section 53.

Note that it is also possible to employ an arrangement in which the manual display application 33a appropriately changes which of the display section 13 of the multifunction peripheral 10 and the display section 53 of the display device 50 an operation manual is to be displayed on.

For example, it is possible to employ an arrangement in which (i) a user of the multifunction peripheral 10 presets whether an operation manual is displayed on the display section 13 or displayed on the display section 53 and (ii) the manual display application 33a changes, on the basis of this user's setting, which of the display section 13 and the display section 53 the operation manual is to be displayed on.

It is also possible to employ an arrangement in which (i) the manual display application 33a determines whether or not the display device 50 is disposed in the vicinity of the multifunction peripheral 10 and (ii) in a case where the display device 50 is disposed in the vicinity of the multifunction peripheral 10, the operation manual is displayed on the display section 53, whereas in a case where the display device 50 is not disposed in the vicinity of the multifunction peripheral 10, the operation manual is displayed on the display section 13. For example, it is possible to employ an arrangement in which (i) in a case where the display device 50 is disposed in the vicinity of the multifunction peripheral 10, associated information in which the display device 50 and the multifunction peripheral 10 corresponding to the display device 50 are associated with each other is stored in the multifunction peripheral 10, the display device 50, the information processing apparatus 30, or another apparatus connected to the communication network and (ii) at the time of display of a manual, the manual display application 33a determines, on the basis of presence or absence of the associated information, whether or not the display device 50 is disposed in the vicinity of the multifunction peripheral 10.

Further, it is also possible to employ an arrangement in which the manual display application 33a (i) acquires information (e.g., screen size, resolution) concerning display capability from the multifunction peripheral 10 and the display device 50 and (ii) changes which of the display section 13 and the display section 53 the operation manual is to be displayed on, on the basis of a display content (e.g., display size, the number of characters, character size) of a part of an operation manual which part is to be displayed and the display capability of the multifunction peripheral 10 and the display device 50. For example, it is possible to employ an arrangement in which in a case where a size of a display screen of the display section 13 is equal to or larger than a predetermined size which allows both of a UI screen (operation screen) and an operation manual to be displayed concurrently, the operation manual is displayed on part of the display section 13, whereas in a case where the size of the display screen of the display section 13 is smaller than the predetermined size, the operation manual is displayed on the display section 53. Alternatively, it is also possible to employ an arrangement in which in a case where the size of the display screen of the display section 13 is equal to or larger than a predetermined size which allows a region exclusive for display of an operation manual to be set in a UI screen of the display section 13, the operation manual is displayed on the exclusive region of the UI screen displayed on the display section 13, whereas in a case where the size of the display screen of the display section 13 is smaller than the predetermined size, the operation manual is displayed on the display section 53. Alternatively, it is also possible to employ an arrangement in which information on display capability of the multifunction peripheral 10 and the display device 50 is registered in advance in the information processing apparatus 30. For example, it is possible to employ an arrangement in which an operation manual is displayed on the display device 50 in a case where only a character size equal to or smaller than a predetermined size can be displayed on the display section 13 of the multifunction peripheral 10.

Note that a method of acquiring the information on display capability is not limited to a specific one. For example, it is possible to employ a method in which the manual display application 33a acquires such information on display capability by requesting the multifunction peripheral 10 and the display device 50 to send the information. Alternatively, it is also possible to employ a method in which the multifunction peripheral 10 sends, to the information processing apparatus 30, such information on display capability along with user operation information in the process of S25 of FIG. 5. Alternatively, it is also possible to employ a method in which the multifunction peripheral 10 sends, to the information processing apparatus 30, such information on display capability along with a request to send a login screen or along with authentication information in the process in S72 or the process in S75 of FIG. 15. Alternatively, a method of acquiring the information on display capability may be registered in advance in the information processing apparatus 30.

It is possible to employ an arrangement in which the manual display application 33a changes a display content of a manual in accordance with model or display capability of the multifunction peripheral 10. For example, it is possible to employ an arrangement in which a font size for manual display is changed in accordance with a screen size and resolution or it is possible to employ an arrangement in which a font color and a background color are changed in accordance with color/monochrome/the number of colors to be displayed.

Specifically, for example, in a case where the standard function of the multifunction peripheral 10 is used, the multifunction peripheral 10 sends, to the information processing apparatus 30, model or property information (screen size, resolution, color/monochrome/the number of colors to be displayed, etc.) concerning display capability of the multifunction peripheral 10 and the display device 50 along with user operation information in the process of S25 of FIG. 5. The manual display application 33a of the information processing apparatus 30 retrieves (or generates) manual display data corresponding to the user operation information and to the property information in the process in S32 of FIG. 5. Specifically, in the information processing apparatus 30, a table in which (i) identification information (mode identification information, set item identification information, etc.) contained in the user operation information sent from the multifunction peripheral 10, (ii) the property information concerning the display capability, and (iii) the manual display data are associated with each other is stored in advance, and the manual display application 33a retrieves the manual display data by referring to the table. Alternatively, it is possible to employ an arrangement in which (i) an operation manual described in a document format such as HTML and a style sheet corresponding to the property information are stored in advance and (ii) the manual display application 33a generates manual display data by applying the style sheet corresponding to the property information to a part, corresponding to the user operation information, of the operation manual.

In a case where the expanded function is used, the multifunction peripheral 10 sends, to the information processing apparatus 30, model or property information concerning display capability of the multifunction peripheral 10 and the display device 50 along with a request to send a login screen or authentication information in the process in S72 or S75 of FIG. 15. Further, the document management application 33b which operates in the information processing apparatus 30 sends, to the manual display application 33a, the property information along with user operation information (or notification corresponding to the user operation information; notification from OSA) in the process in S102 of FIG. 15. Further, the manual display application 33a which operates in the information processing apparatus 30 retrieves (or generates) manual display data corresponding to the user operation information and to the property information in the process in S111 of FIG. 15.

Alternatively, it is also possible to employ an arrangement in which the manual display application 33a changes a display content of a manual in accordance with present or absence of an optional device (e.g., automatic document carrying device, post-processing device (device which carries out processing such as staple processing, sorting processing, and punching processing with respect to a sheet on which an image has been formed), large-capacity paper feeding device) attached to the multifunction peripheral 10 and a type of the optional device.

Specifically, for example, in a case where the standard function of the multifunction peripheral 10 is used, the multifunction peripheral 10 sends, to the information processing apparatus 30, option information indicative of the optional device attached to the multifunction peripheral 10 along with user operation information in the process in S25 of FIG. 5. The manual display application 33a which operates in the information processing apparatus 30 retrieves (or generates) manual display data corresponding to the user operation information and to the option information in the process in S32 of FIG. 5. Specifically, in the information processing apparatus 30, a table in which (i) identification information (mode identification information, set item identification information, etc.) contained in the user operation information sent from the multifunction peripheral 10, (ii) the option information, and (iii) the manual display data are associated with each other is stored in advance, and the manual display application 33a retrieves manual display data by referring to the table. Alternatively, it is possible to employ an arrangement in which the manual display application 33a generates manual display data in accordance with the option information by determining, in accordance with the option information, whether or not a part corresponding to the optional device out of part, corresponding to the user operation information, of the operation manual is to be contained in the manual display data.

In a case where the expanded function is used, the multifunction peripheral 10 sends, to the information processing apparatus 30, the option information along with a request to send a login screen or authentication information in the process in S72 or S75 of FIG. 15. Further, the document management application 33b which operates in the information processing apparatus 30 sends, to the manual display application 33a, the option information along with user operation information (or notification corresponding to the user operation information; notification from OSA) in the process in S102 of FIG. 15. Further, the manual display application 33a which operates in the information processing apparatus 30 retrieves (or generates) manual display data corresponding to the user operation information and to the option information in the process in S111 of FIG. 15.

It is thus possible to carry out manual display corresponding to the optional device attached to the multifunction peripheral 10. As a result, convenience for a user can be improved. For example, in a case where a two-sided printing unit is mounted as the optional device, a manual corresponding to the two-sided copying unit is displayed so that an optimum mode setting corresponding to the optional device can be presented to the user (for example, two-sided copy is recommended for reduction of sheet consumption). Further, even in a case where the expanded function does not support use of an optional device, an appropriate advice can be given to a user by displaying a manual corresponding such a case.

Alternatively, it is possible to employ an arrangement in which the manual display application 33a changes a display content of a manual in accordance with a user of the multifunction peripheral 10. For example, it is possible to employ an arrangement in which (i) users are classified into a plurality of groups (e.g., beginner, general user, administrator) in accordance with a degree of familiarity with the multifunction peripheral 10 and (ii) a display content of a manual is changed depending on to which group a user belongs.

Specifically, for example, in a case where the standard function of the multifunction peripheral 10 is used, the multifunction peripheral 10 sends, to the information processing apparatus 30, user property information indicative of an attribute of a user (e.g., which of the beginner, general user, and administrator the user belongs to) along with user operation information in the process in S25 of FIG. 5. The manual display application 33a of the information processing apparatus 30 retrieves (or generates) manual display data corresponding to the user operation information and to the user property information in the process in S32 of FIG. 5. Specifically, in the information processing apparatus 30, a table in which (i) identification information (mode identification information, set item identification information, etc.) contained in the user operation information sent from the multifunction peripheral 10, (ii) the user property information, and (iii) the manual display data are associated with each other is stored in advance, and the manual display application 33a retrieves the manual display data by referring to the table. Alternatively, it is possible to employ an arrangement in which (i) an operation manual described in a document format such as HTML and a style sheet corresponding to the user property information are stored in advance and (ii) the manual display application 33a generates manual display data by applying the style sheet corresponding to the user property information to a part, corresponding to the user operation information, of the operation manual. For example, in a case where the user is a beginner, an information amount per screen may be reduced as compared with a case where the user is a general user or an information amount may be increased as compared with display for a general user by displaying a moving image or by outputting part of manual information by using audio. In a case where the user is an administrator, information (e.g., method for operating a main body setting menu) necessary for management may be additionally displayed.

In a case where the expanded function is used, the multifunction peripheral 10 sends, to the information processing apparatus 30, the user property information along with user authentication information in the process in S75 of FIG. 15. Further, the document management application 33b which operates in the information processing apparatus 30 causes user property information received from the multifunction peripheral 10 in S93 of FIG. 15 to be stored in a memory (not illustrated) and sends, to the manual display application 33a, the user property information along with user operation information (or notification corresponding to the user operation information; notification from OSA) in the process in S102 of FIG. 15. The manual display application 33a which operates in the information processing apparatus 30 retrieves (or generates) manual display data corresponding to the user operation information and to the user property information in the process in S111 of FIG. 15.

Note that a method for acquiring the user property information is not limited to a specific one. For example, a user himself/herself may select the user property information by operating the input section 12. Alternatively, it is also possible to employ an arrangement in which (i) user authentication processing is carried out at the start of use of the multifunction peripheral 10, (ii) user identification information and user property information are associated with each other and stored, and (iii) user property information is detected in accordance with user identification information inputted in the user authentication processing. Specifically, for example, in response to activation of the multifunction peripheral 10, the apparatus control section 16 of the multifunction peripheral 10 causes the display section 13 to display a screen prompting a user to input user authentication information before causing the display section 13 to display a mode selection screen (see S21 of FIG. 2). Then, when the user authentication information is inputted, the user authentication information is sent to an authentication processing section (not illustrated). The authentication processing section carries out user authentication processing by collating the user authentication information inputted by the user with user authentication information for users who are permitted to use the multifunction peripheral 10 which user authentication information is registered in advance. In a case where the user authentication information inputted by the user coincides with the user authentication information that is registered in advance, the authentication processing section detects user property information of the user which is associated with the user authentication information and is registered in advance, and then sends the user property information to the apparatus control section 16 of the multifunction peripheral 10. Note that the authentication processing section may be provided in the multifunction peripheral 10 or may be provided in an authentication server (not illustrated) that is communicably connected to the multifunction peripheral 10.

In the present embodiment, all of the manual display application 33a, the document management application 33b, and the ledger sheet printing application 33c operate in the information processing apparatus 30. However, the present embodiment is not limited to this. That is, it is possible to employ an arrangement in which one or more of these applications operates in another apparatus that is communicably connected to the multifunction peripheral 10 and/or the information processing apparatus 30. The document management application 33b and the ledger sheet printing application 33c are examples of the application (OSA application) for achieving the expanded function of the multifunction peripheral 10, and other OSA applications (external applications) may be used which operate in the information processing apparatus 30 or another apparatus that are communicably connected to the multifunction peripheral 10.

In the present embodiment, the sections (blocks) of the multifunction peripheral 10, the information processing apparatus 30, and the display device 50, especially the apparatus control section 16 and the web browser section 18 of the multifunction peripheral 10, the external application section 33 and the web server section 32 of the information processing apparatus 30, and part or all of the apparatus control section 52 of the display device 50 may be realized by way of software as executed by a processor such as CPU. In this case, the multifunction peripheral 10, the information processing apparatus 30, and the display device 50 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the multifunction peripheral 10, the information processing apparatus 30, and the display device 50 a computer-readable storage medium containing control program code (executable program, intermediate code program, or source program) for the multifunction peripheral 10, the information processing apparatus 30, and the display device 50, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R/Blu-ray Disc (Registered Trademark); a card, such as an IC card (memory card) or an optical card; or a semiconductor memory, such as a mask ROM/EPROM/EEPROM/flash ROM.

The multifunction peripheral 10, the information processing apparatus 30, and the display device 50 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network.

The blocks of the multifunction peripheral 10, the information processing apparatus 30, and the display device 50 are not limited to ones realized by way of software. For example, the blocks of the multifunction peripheral 10, the information processing apparatus 30, and the display device 50 may be realized by way of hardware or may be a combination of hardware that carries out part of processing and computation means for executing software controlling the hardware and carrying out the remaining processing.

A display control apparatus of the present invention is a display control apparatus for controlling a display content of a display section of a multifunction peripheral that is communicably connected to the display control apparatus or a display content of a display section that is disposed in vicinity of the multifunction peripheral, the multifunction peripheral having (i) a standard function of controlling one or a plurality of apparatus functions of the multifunction peripheral with use of a standard application operating in the multifunction peripheral and (ii) an expanded function of controlling the one or a plurality of apparatus functions of the multifunction peripheral with use of an external application operating in another apparatus communicably connected to the multifunction peripheral, and the multifunction peripheral including an operation input section for accepting operation input from a user of the multifunction peripheral, the display control apparatus including a manual display control section that controls display, on the display section, of both of an operation manual of the standard application and an operation manual of the external application, the manual display control section causing the display section to display an operation manual of an application for which an operation is being inputted by the user via the operation input section out of the standard application and the external application.

According to the configuration, the manual display control section controls display, on the display section, of both of the operation manual of the standard application and the operation manual of the external application, and causes the display section to display an operation manual of an application for which an operation is being inputted by a user via the operation input section. That is, according to the configuration, the manual display control section common to the standard application and the external application controls display of an operation manual regardless of whether an application for which an operation is being inputted by a user is the standard application or the external application. This allows operation manuals of the respective applications to be displayed in a unified manner regardless of whether an application for which an operation is being inputted by a user is the standard application or the external application. Further, since the display control apparatus controls display of a manual on a display section of the multifunction peripheral or on a display section disposed in the vicinity of the multifunction peripheral, a display content (e.g., description of the manual, display setting of the manual) of the display section of the multifunction peripheral or the display section disposed in the vicinity of the multifunction peripheral can be easily changed only by giving a change instruction to the display control apparatus.

The display control apparatus may be configured such that the manual display control section causes an operation manual of each of the standard and external applications to be displayed on the display section on the basis of a common display policy (display rule defining at least one of a font type, a character size, a character color, a line spacing, and a background color). For example, the display control apparatus may be configured such that the manual display control section (i) acquires the operation manual of a document format from the multifunction peripheral or said another apparatus or reads out the operation manual of the document format from a storage section provided in the display control apparatus and (ii) causes the display section to display the operation manual by applying, to the operation manual of the document format, a style sheet defining at least one of the font type, character size, character color, line spacing, and background color.

According to the configuration, the operation manuals of the respective applications can be displayed so that at least one of the font type, character size, character color, line spacing, and background color is common to all of the applications. This allows the operation manuals of the respective applications to be displayed in a more unified manner.

Further, the display control apparatus may be configured such that the style sheet applied by the manual display control section is common to the operation manuals of the standard and external applications.

According to the configuration, each item defined in the style sheet can be made common to all of the applications. This allows the operation manuals of the respective applications to be displayed in a more unified manner.

Further, the display control apparatus may be configured such that the manual display control section causes the display section to display the operation manual of the application for which an operation is being inputted by the user via the operation input section by applying, to the operation manual of the application, a style sheet associated in advance with the application, the style sheet being selected from a plurality of style sheets which are same in one or more of a plurality of items including at least one of the font type, character size, character color, line spacing, and background color and which are different in remaining items.

According to the configuration, one or more of a plurality of items including at least one of the font type, character size, character color, line spacing, and background color can be made common to all of the applications, and the remaining items can be set independently for each of the applications. Accordingly, the operation manuals of the respective applications can be displayed in part independently for each of the applications while displaying the operation manuals of the respective applications in a unified manner.

The display control apparatus may be configured such that the display section is (i) part of an operation screen display section of the multifunction peripheral which operation screen display section is for displaying an operation screen for operation input from a user or (ii) a display device disposed in a place that is in the vicinity of the multifunction peripheral and that is viewable from the user operating the operation input section, and the manual display control section causes the display device to display the operation manual in a case where the display device is disposed in the vicinity of the multifunction peripheral, whereas the manual display control section causes the operation screen display section to display the operation manual in a case where the display device is not disposed in the vicinity of the multifunction peripheral.

Further, the display control apparatus may be configured such that the display section is (i) part of an operation screen display section of the multifunction peripheral which operation screen display section is for displaying an operation screen for operation input from a user or (ii) a display device disposed in a place that is in the vicinity of the multifunction peripheral and that is viewable from the user operating the operation input section, and the manual display control section causes the part of the operation screen display section to display the operation manual in a case where a size of a display screen of the operation screen display section is equal to or larger than a predetermined size which allows the operation screen and the operation manual to be displayed concurrently, whereas the manual display control section causes the display device to display the operation manual in a case where the size of the display screen of the operation screen display section is smaller than the predetermined size.

According to the configurations, the operation manual is displayed on (i) the part of the operation screen display section on which the operation screen is displayed or (ii) the display device disposed in a place viewable from a user operating the operation input section. This allows the user to input operation while referring to the operation manual.

Further, the display control apparatus may be configured such that the manual display control section causes the display section to display another image instead of the operation manual in a case where no operation has been inputted by a user on the operation input section for a predetermined period of time after the manual display control section causes the display section to display the operation manual.

According to the configuration, it is possible to prevent troubles such as burn-in of a display screen which occurs in a case where the operation manual is displayed for a long period of time. Further, in a case where information such as a variety of advertisement information, event information, or message information is displayed instead of the operation manual, the display section can be effectively utilized while no operation is being inputted.

Further, the display control apparatus may be configured such that the manual display control section detects a content of an operation inputted by a user, on the basis of user operation information that is sent from the multifunction peripheral or the external application with the use of a HTTP protocol.

According to the configuration, the display control apparatus can control display with the use of a conventionally generally used web communication technique (communication technique used between a web server and a web browser). Further, for example, even in a case where the multifunction peripheral is provided inside a firewall and where the display control apparatus is provided outside the firewall, user operation information can be sent to the display control apparatus without influence of the firewall by sending the user operation information from the multifunction peripheral to the display control apparatus with the use of the HTTP protocol.

Further, the display control apparatus may be configured to include an external application processing section for causing the external application to operate.

According to the configuration, the display control apparatus not only controls the apparatus function of the multifunction peripheral, but also controls display of an operation manual of an application that is being used in the multifunction peripheral.

Further, the display control apparatus may be configured such that the manual display control section changes a display content of the operation manual in accordance with display capability of the display section.

According to the configuration, a manual can be displayed in accordance with the display capability of the display section.

Further, the display control apparatus may be configured such that the manual display control section changes a display content of the operation manual in accordance with (i) whether or not an optional device, which is a device optionally attached to the multifunction peripheral, is attached to the multifunction peripheral and (ii) a type of the optional device attached to the multifunction peripheral.

According to the configuration, a manual can be displayed in accordance with presence or absence of the optional device.

Further, the display control apparatus may be configured such that the manual display control section changes a display content of the operation manual in accordance with an attribute of a user who inputs operation via the operation input section.

According to the configuration, a manual can be displayed in accordance with an attribute of a user.

A multifunction peripheral control system of the present invention includes (i) a multifunction peripheral and (ii) any of the aforementioned display control apparatuses for controlling a display content of a display section of the multifunction peripheral or a display content of a display section disposed in the vicinity of the multifunction peripheral.

According to the configuration, the operation manuals of the respective applications can be displayed in a unified manner regardless of whether an application that is being used is the standard application or the external application.

A display control method of the present invention is a display control method in a multifunction peripheral control system including (i) a multifunction peripheral and (ii) a display control apparatus that is communicably connected to the multifunction peripheral and that controls a display content of a display section of the multifunction peripheral or a display content of a display section that is disposed in vicinity of the multifunction peripheral, the multifunction peripheral having (i) a standard function of controlling one or a plurality of apparatus functions of the multifunction peripheral with use of a standard application operating in the multifunction peripheral and (ii) an expanded function of controlling the one or a plurality of apparatus functions of the multifunction peripheral with use of an external application operating in another apparatus communicably connected to the multifunction peripheral, and the multifunction peripheral including an operation input section for accepting operation input from a user of the multifunction peripheral, the display control method including the step of (a) causing a manual display control section, which is provided in the display control apparatus and which is common to the standard application and the external application, to control display, on the display section, of both of an operation manual of the standard application and an operation manual of the external application, in the step (a), an operation manual of an application for which an operation is being inputted by the user via the operation input section being displayed on the display section.

According to the method, the operation manuals of the respective applications can be displayed in a unified manner regardless of whether an application that is being used is the standard application or the external application.

The display control apparatus may be realized by a computer. In this case, the scope of the present invention encompasses (i) a program for causing a computer to operate as the manual display control section so that the display control apparatus is realized by the computer and (ii) a computer readable recording medium in which the program is stored.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention is applicable to (i) a multifunction peripheral control system in which a multifunction peripheral and an information processing apparatus that are communicably connected to each other via a communication network operate in association with each other and (ii) a multifunction peripheral control method.

REFERENCE SIGNS LIST

10: Multifunction peripheral
11: Operation section
12: Input section (operation input section)
13: Display section (operation screen display section)
30: Information processing apparatus (display control apparatus, another apparatus)
33: External application section (manual display control section, external application processing section)
33a: Manual display application
33b: Document management application (external application)
33c: Form printing application (external application)
50: Display device
53: Display section
100: Multifunction peripheral control system

The invention claimed is:

1. A display control apparatus for controlling a display content of a display section of a multifunction peripheral that is communicably connected to the display control apparatus, the display section being included by the multifunction peripheral or disposed in vicinity of the multifunction peripheral, the multifunction peripheral having (i) a standard function of controlling one or a plurality of apparatus functions of the multifunction peripheral with use of a standard application operating in the multifunction peripheral and (ii) an expanded function of controlling said one or a plurality of apparatus functions of the multifunction peripheral with use of an external application operating in another apparatus communicably connected to the multifunction peripheral, and the multifunction peripheral including an operation input section for accepting operation input from a user of the multifunction peripheral, the display control apparatus comprising a manual display control section that controls display, on the display section, of both of an operation manual of the standard application and an operation manual of the external application, the manual display control section causing the display section to display an operation manual of an application for which an operation is being inputted by the user via the operation input section out of the standard application and the external application.

2. The display control apparatus according to claim 1, wherein:

the manual display control section causes an operation manual of each of the standard and external applications to be displayed on the display section on basis of a common display policy, and the common display policy is a display policy defining at least one of a font type, a character size, a character color, a line spacing, and a background color.

3. The display control apparatus according to claim 2, wherein the manual display control section (i) acquires the operation manual of a document format from the multifunction peripheral or said another apparatus or reads out the operation manual of the document format from a storage section provided in the display control apparatus and (ii) causes the display section to display the operation manual by applying, to the operation manual of the document format, a style sheet defining at least one of the font type, character size, character color, line spacing, and background color.

4. The display control apparatus according to claim 3, wherein the style sheet applied by the manual display control section is common to the operation manuals of the standard and external applications.

5. The display control apparatus according to claim 3, wherein the manual display control section causes the display section to display the operation manual of the application for which an operation is being inputted by the user via the operation input section by applying, to the operation manual of the application, a style sheet associated in advance with the application, the style sheet being selected from a plurality of style sheets which are same in one or more of a plurality of items including at least one of the font type, character size, character color, line spacing, and background color and which are different in remaining items.

6. A display control method in a multifunction peripheral control system including (i) a multifunction peripheral and (ii) a display control apparatus that is communicably connected to the multifunction peripheral and that controls a display content of a display section of the multifunction peripheral, the display section being included by the multifunction peripheral or disposed in vicinity of the multifunction peripheral, the multifunction peripheral having (i) a standard function of controlling one or a plurality of apparatus functions of the multifunction peripheral with use of a standard application operating in the multifunction peripheral and (ii) an expanded function of controlling said one or a plurality of apparatus functions of the multifunction peripheral with use of an external application operating in another apparatus communicably connected to the multifunction peripheral, and the multifunction peripheral including an operation input section for accepting operation input from a user of the multifunction peripheral, the display control method comprising the step of (a) causing a manual display control section, which is provided in the display control apparatus and which is common to the standard application and the external application, to control display, on the display section, of both of an operation manual of the standard application and an operation manual of the external application, in the step (a), an operation manual of an application for which an operation is being inputted by the user via the operation input section being displayed on the display section.

* * * * *